(12) United States Patent
Kang et al.

(10) Patent No.: US 10,952,076 B2
(45) Date of Patent: Mar. 16, 2021

(54) ELECTRONIC DEVICE AND OPERATING METHOD THEREFOR

(71) Applicant: Samsung Electronics Co., Ltd., Suwon-si (KR)

(72) Inventors: Tae-Young Kang, Seoul (KR); Hyunjoo Kang, Suwon-si (KR); Indon Ju, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/072,748

(22) PCT Filed: Jan. 24, 2017

(86) PCT No.: PCT/KR2017/000832
§ 371 (c)(1),
(2) Date: Jul. 25, 2018

(87) PCT Pub. No.: WO2017/131417
PCT Pub. Date: Aug. 3, 2017

(65) Prior Publication Data
US 2019/0037068 A1 Jan. 31, 2019

(30) Foreign Application Priority Data

Jan. 27, 2016 (KR) ........................ 10-2016-0009747

(51) Int. Cl.
*H04W 52/02* (2009.01)
*H04W 12/06* (2021.01)
(Continued)

(52) U.S. Cl.
CPC ... *H04W 12/0609* (2019.01); *H04M 1/72569* (2013.01); *H04M 1/72577* (2013.01);
(Continued)

(58) Field of Classification Search
CPC ....... H04W 76/14; H04W 12/04; H04W 4/80; H04W 84/12; H04W 84/18; H04W 88/06;
(Continued)

(56) References Cited

U.S. PATENT DOCUMENTS 9,602,806 B1 * 3/2017 Stafford ............... H04N 13/194
10,614,776 B2 4/2020 Kang et al.
(Continued)

FOREIGN PATENT DOCUMENTS

| CN | 102640427 A | 8/2012 |
| EP | 2 302 881 A1 | 3/2011 |

(Continued)

OTHER PUBLICATIONS

Extended European Search Report dated Oct. 16, 2018, issued in European Application No. 17744538.4-1218 / 3393176.
(Continued)

*Primary Examiner* — Jean A Gelin
(74) *Attorney, Agent, or Firm* — Jefferson IP Law, LLP

(57) ABSTRACT

An electronic device and an operating method therefor, according to various examples, can be configured to: detect an activation signal generated by the electronic device; activate a predetermined communication function in response to the activation signal; and receive a reference signal through the activated communication function.

14 Claims, 25 Drawing Sheets

(51) Int. Cl.
*H04W 88/02* (2009.01)
*H04W 68/00* (2009.01)
*H04M 1/725* (2021.01)
*H04M 1/73* (2006.01)

(52) U.S. Cl.
CPC ............ *H04M 1/73* (2013.01); *H04W 52/02* (2013.01); *H04W 52/0251* (2013.01); *H04W 68/00* (2013.01); *H04W 68/005* (2013.01); *H04W 88/02* (2013.01); *H04M 2250/12* (2013.01); *Y02D 30/70* (2020.08)

(58) Field of Classification Search
CPC .... H04W 8/005; G06F 1/3234; G06F 3/0416; G06F 3/04886; G06F 3/167; H04M 1/271; H04M 1/67; H04M 1/72522; H04M 2250/12; H04M 2250/74
See application file for complete search history.

(56) References Cited

U.S. PATENT DOCUMENTS

| | | | | |
|---|---|---|---|---|
| 2002/0039904 | A1* | 4/2002 | Anderson | G01S 5/02 455/456.1 |
| 2006/0038676 | A1* | 2/2006 | Richards | G08B 21/0294 340/539.23 |
| 2006/0234778 | A1* | 10/2006 | Matsushita | H04B 1/406 455/565 |
| 2011/0070829 | A1* | 3/2011 | Griffin | H04M 1/7253 455/41.1 |
| 2011/0081944 | A1* | 4/2011 | Tsegay | H04M 1/67 455/556.1 |
| 2011/0136476 | A1* | 6/2011 | Beasley | H04M 1/72577 455/414.1 |
| 2011/0237230 | A1* | 9/2011 | Li | H04M 3/54 455/414.1 |
| 2011/0274031 | A1* | 11/2011 | Gaal | H04L 5/0051 370/315 |
| 2012/0081212 | A1* | 4/2012 | Ishihara | H04L 12/12 340/10.4 |
| 2012/0202556 | A1* | 8/2012 | Mori | H04W 36/30 455/525 |
| 2013/0040631 | A1* | 2/2013 | Truskovsky | H04M 1/72577 455/420 |
| 2013/0250826 | A1* | 9/2013 | Tanizawa | H04W 52/0212 370/311 |
| 2014/0105416 | A1 | 4/2014 | Huttunen et al. | |
| 2014/0153557 | A1 | 6/2014 | Kim | |
| 2014/0177615 | A1 | 6/2014 | Kim et al. | |
| 2014/0256305 | A1* | 9/2014 | Ginis | H04M 1/72572 455/418 |
| 2014/0308898 | A1 | 10/2014 | Lee et al. | |
| 2015/0058123 | A1 | 2/2015 | Lenahan et al. | |
| 2015/0365898 | A1* | 12/2015 | Matsushita | H04M 1/7253 455/574 |
| 2016/0197927 | A1* | 7/2016 | Ma | H04L 45/245 726/4 |
| 2016/0205337 | A1* | 7/2016 | Cho | H04N 21/472 348/734 |
| 2017/0013562 | A1* | 1/2017 | Lim | G06F 1/1626 |
| 2017/0031556 | A1* | 2/2017 | Yang | G06F 3/0488 |
| 2017/0071018 | A1* | 3/2017 | Pidhorodetskyi | H04W 4/80 |
| 2017/0245311 | A1* | 8/2017 | Murray | H04W 12/02 |
| 2017/0278516 | A1* | 9/2017 | Choi | H04M 1/271 |
| 2019/0362722 | A1* | 11/2019 | Higbie | G10L 25/78 |
| 2020/0204963 | A1* | 6/2020 | Park | H04W 4/80 |

FOREIGN PATENT DOCUMENTS

| | | |
|---|---|---|
| KR | 10-2012-0128017 A | 11/2012 |
| KR | 10-2014-0071784 A | 6/2014 |
| KR | 10-2014-0080236 A | 6/2014 |
| KR | 10-1404234 B1 | 6/2014 |
| KR | 10-2014-0124304 A | 10/2014 |
| KR | 10-2017-0076347 A | 7/2017 |
| WO | 2017/111373 A1 | 6/2017 |

OTHER PUBLICATIONS

European Office Action dated Oct. 14, 2019, issued in European Patent Application No. 17 744 538.4.
European Office Action dated Aug. 6, 2020, issued in European Patent Application No. 17 744 538.4.
Chinese Office Action dated Dec. 3, 2020, issued in Chinese Patent Application No. 201780008170.6.

\* cited by examiner

ELECTRONIC DEVICE AND OPERATING METHOD THEREFOR

TECHNICAL FIELD

Various embodiments relate to an electronic device and an operating method thereof.

BACKGROUND ARTS

Generally, as digital technologies have recently developed, various types of electronic devices are widely utilized, such as a mobile communication terminal, a smart phone, a tablet Personal Computer (PC), a Personal Digital Assistant (PDA), an electronic organizer, a notebook, a wearable device, or the like. The above electronic devices have arrived at a mobile convergence stage of managing even the functions of other devices. For example, an electronic device may provide a call function such as a voice call, a video call or the like, a message transmission/reception function such as a Short Message Service (SMS)/Multimedia Message Service (MMS), an e-mail, or the like, an electronic organizer function, a photographing function, a broadcasting program reproduction function, a video reproduction function, a music reproduction function, an Internet function, a messenger function, a game function, a Social Network Service (SNS) function, or the like. An electronic device has been designed in various types.

DETAILED DESCRIPTION OF THE INVENTION

Technical Problem

The above electronic device has a problem of unilaterally receiving various wireless signals. That is, when a communication function has been activated, an electronic device unconditionally receives wireless signals. Accordingly, a user of the electronic device has to identify an undesired message and is thus inconvenient. Further, the power consumption of the electronic device may be increased. Meanwhile, an electronic device has a difficulty in receiving a desired wireless signal. That is, when a communication function has been deactivated, a user of the electronic device should perform a complex operation, such as changing a configuration, to activate the communication function of the electronic device, and is thus inconvenient.

Technical Solution

An operating method of an electronic device according to various embodiments may include: detecting an activation signal generated in the electronic device; activating a predetermined communication function in response to the activation signal; and receiving a reference signal through the activated communication function.

An electronic device according to various embodiments may include: a communication unit; and a control unit functionally connected to the communication unit.

In the electronic device according to various embodiments, the control unit may be configured to: detect an activation signal generated in the electronic device; activate the communication unit in response to the activation signal; and receive a reference signal through the activated communication unit.

Advantageous Effects

According to various embodiments, an electronic device does not unconditionally receive a reference signal but receives the reference signal in response to an activation signal. That is, the electronic device can receive a reference signal only as needed. Therefore, the power consumption of the electronic device can be decreased. In addition, the electronic device can receive a reference signal without performing a complex operation, such as changing a configuration by a user of the electronic device. Therefore, the electronic device can easily receive information of interest. Accordingly, the operation efficiency of the electronic device can be improved. In addition, the electronic device can detect an activation signal from a simple operation of a user. Therefore, a user convenience with the electronic device can be improved.

MODE FOR CARRYING OUT THE INVENTION

Figure 1:
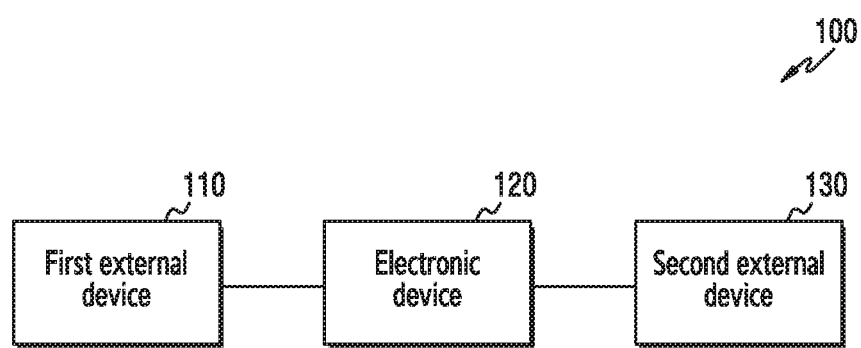
FIG. 1 is a block diagram illustrating a communication system according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "at least one of A or/and B" include any and all combinations of words enumerated with it. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

FIG. 1 is a block diagram illustrating a communication system 100 according to various embodiments.

Referring to FIG. 1, the communication system 100 according to various embodiments may include a first external device 110, an electronic device 120, and a second external device 130. The first external device 110, the electronic device 120, and the second external device 130 may be different types of devices from each other, or at least two of the first external device 110, the electronic device 120, and the second external device 130 may be the same type of device. The first external device 110, the electronic device 120, and the second external device 130 may access one another and then communicate with each other.

The first external device 110 may transmit a reference signal. A reference signal may include at least one of intrinsic identification information and location information of the first external device 110. The first external device 110 may periodically broadcast a reference signal. Alternatively, the first external device 110 may transmit a reference signal in response to a request of the electronic device 120. For example, the first external device 110 may be coupled to another electronic device. Alternatively, the first external device 110 may be installed at a particular place or mounted in an object. An object is a physical object having a predetermined shape and, for example, may include a workpiece, a product, etc.

The electronic device 120 may have mobility and be operated. That is, the electronic device 120 may be carried by a user and be moved. In the present disclosure, the term a "user" may indicate a person who uses the electronic device 120, or the electronic device 120. For example, the second electronic device 120 may include at least one among a smart phone, a tablet PC, a mobile phone, a video phone, an e-book reader, a netbook computer, a Portable Multimedia Player (PMP), an MP3 player, a medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to various embodiments, the electronic device 120 may receive a reference signal from the first external device 110. The electronic device 120 may respond to an activation signal to receive a reference signal of the first external device 110. Alternatively, the electronic device 120 may respond to an activation signal to request the first external device 110 for a reference signal and receive the reference signal from the first external device 110. An activation signal may be generated in the electronic device 120, and may be detected from at least one of an acoustic signal and a movement signal. For example, an acoustic signal may be generated by tapping on the electronic device 120, and a movement signal may be generated by a movement of the electronic device 120.

According to various embodiments, the electronic device 120 may receive information of interest from the second external device 130. The electronic device 120 may use a reference signal to receive information of interest from the second external device 130. Then, the electronic device 120 may display information of interest.

The second external device 130 may transmit information of interest. The second external device 130 may transmit information of interest based on a reference signal. To this end, the second external device 130 may have stored information of interest. The second external device 130 may have stored information of interest corresponding to a reference signal. Then, the second external device 130 may transmit the information of interest to the electronic device 120 in response to a request of the electronic device 120. For example, the second external device 130 may include at least one among a smart phone, a tablet PC, a mobile phone, a video phone, an e-book reader, a desktop PC, a laptop PC, a netbook computer, a workstation, a server, a Portable Multimedia Player (PMP), an MP3 player, a medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

Figure 2:
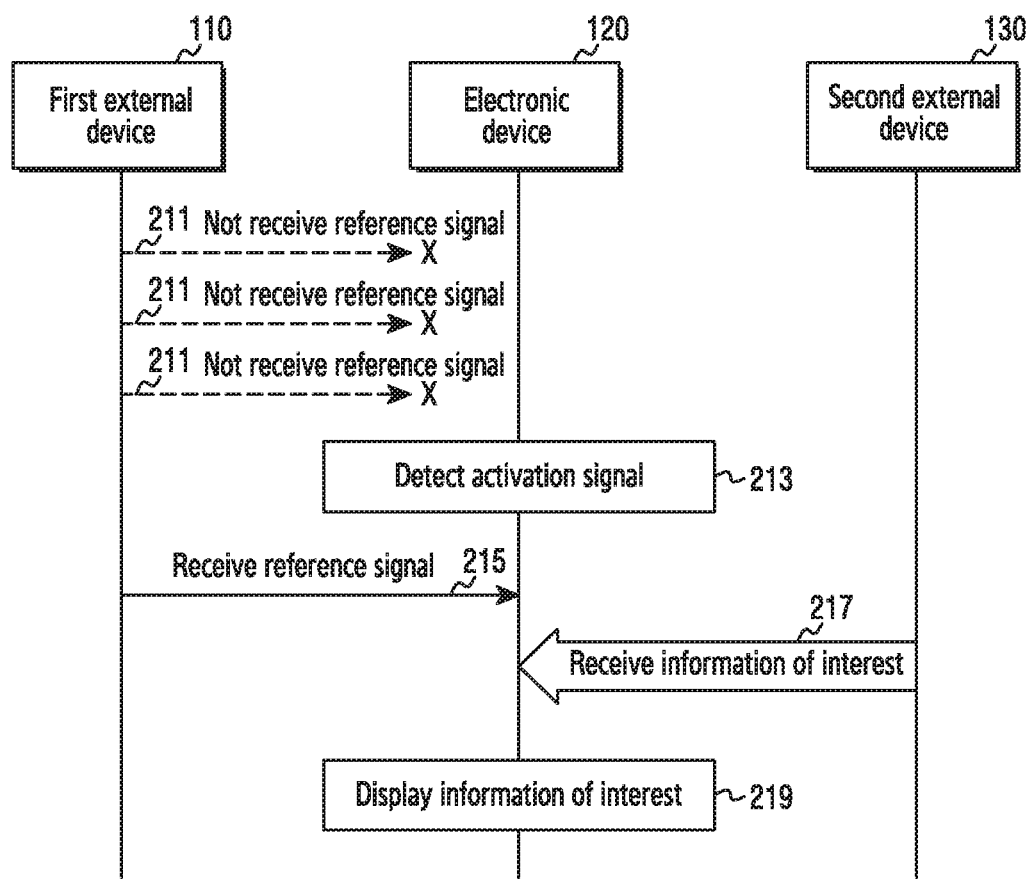
FIG. 2 is a signal flow diagram illustrating a signal flow in a communication system according to various embodiments.

FIG. 2 is a signal flow diagram illustrating a signal flow in the communication system 100 according to various embodiments.

Referring to FIG. 2, the first external device 110 may transmit a reference signal in operation 211. The reference signal may include at least one of intrinsic identification information and location information of the first external device 110. The first external device 110 may periodically broadcast a reference signal. Alternatively, the first external device 110 may transmit a reference signal in response to a request of another electronic device (not illustrated). The electronic device 120 may receive a reference signal. That is, the electronic device 120 may not receive a reference signal even when the first external device 110 transmits the reference signal.

The electronic device 120 may detect an activation signal in operation 213. When the electronic device 120 has been turned on, the electronic device 120 may detect an activation signal regardless of a current state thereof. For example, the electronic device 120 may detect an activation signal in a general power state and may detect an activation signal even in a low power state. The electronic device 120 may detect an activation signal in a display-on state and may detect an activation signal even in a display-off state. An activation signal may be generated in the electronic device 120, and may be detected from at least one of an acoustic signal and a movement signal. For example, an acoustic signal may be generated by tapping on the electronic device 120, and a movement signal may be generated by a movement of the electronic device 120.

Next, the electronic device 120 may receive a reference signal in operation 215. The electronic device 120 may receive a reference signal of the first external device 110 in response to an activation signal. Alternatively, the electronic device 120 may respond to an activation signal to request the first external device 110 for a reference signal and receive the reference signal from the first external device 110. The electronic device 120 may receive a reference signal through a predetermined communication function. For example, a communication function may include at least one among Wi-Fi, ultrasonic communication, Bluetooth, an IC chip, and NFC. To this end, when the communication function has been deactivated, the electronic device 120 may activate the communication function in response to an activation signal. When a reference signal is received, the electronic device 120 may deactivate the communication function. When the communication function has been activated, the electronic device 120 may maintain the communication function. Further, even when a reference signal is received, the electronic device 120 may maintain the communication function.

Next, the electronic device 120 may receive information of interest based on the reference signal in operation 217. The electronic device 120 may receive the information of interest from the second external device 130. Then, the electronic device 120 may display the information of interest in operation 219.

According to an embodiment, the electronic device 120 may receive information of interest from the second external device 130 even when the electronic device 120 does not perform an authentication procedure on a reference signal. For example, when a communication function is an IC chip or NFC, the electronic device 120 may not perform an authentication procedure on a reference signal. This is because, when the communication function is an IC chip or NFC, the electronic device 120 may receive a reference signal from the second external device 130 as the electronic device 120 approaches the second external device 130. Accordingly, the electronic device 120 may use the reference signal to request the second external device 130 for information of interest and may receive the information of interest from the second external device 130 in response to the request.

According to another embodiment, the electronic device 120 may perform an authentication procedure on a reference signal and receive information of interest from the second external device 130 according to the result therefrom. For example, the electronic device 120 may directly perform authentication on a reference signal and then obtain a result from the authentication. Alternatively, the electronic device 120 may request the second external device 130 to authenticate a reference signal. Then, the electronic device 120 may receive an authentication result from the second external device 130. The electronic device 120 may request the second external device 130 for information of interest based on the authentication result, and may receive the information of interest from the second external device 130 in response to the request. With reference to FIGS. 3, 4, 5, and 6, an operation of receiving information of interest according to another embodiment will be described in detail.

Figure 3:
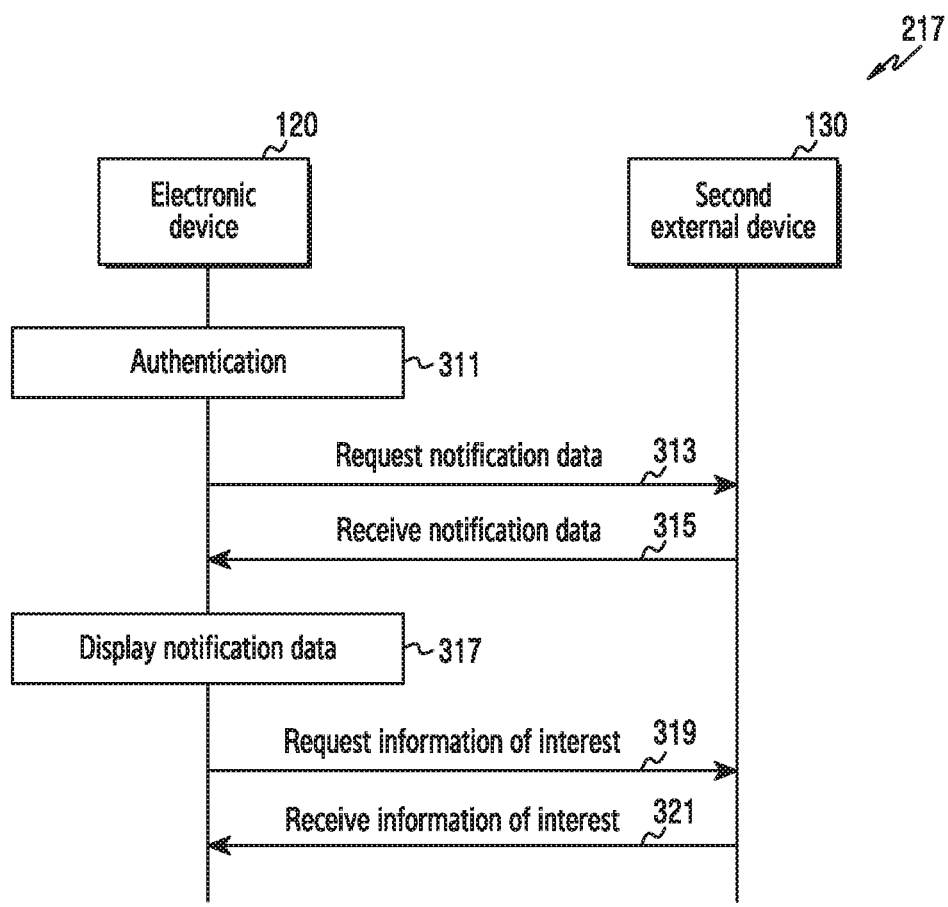
FIG. 3 is a signal flow diagram illustrating a signal flow of the operation of receiving information of interest of FIG. 2.

FIG. 3 is a signal flow diagram illustrating a signal flow of the operation of receiving information of interest of FIG. 2. FIG. 3 illustrates an operation of receiving information of interest according to another embodiment in FIG. 2.

Referring to FIG. 3, in the communication system 100 according to various embodiments, the electronic device 120 may perform authentication on a reference signal in operation 311. For example, the electronic device 120 may detect at least one among identification information and location information of the first external device 110, from a reference signal. The electronic device 120 may use the at least one among identification information of the reference signal and location information of the first external device 110, to perform authentication on the reference signal.

Through the authentication, the electronic device 120 may obtain an authentication result. The authentication result may indicate at least one among an authentication success and an authentication fail. To this end, the electronic device 120 may include an authentication database, or may have been connected to the authentication database. The electronic device 120 may determine whether at least one among identification information of the reference signal and location information of the first external device 110 has been stored in the authentication database. When at least one among identification information of the reference signal and location information of the first external device 110 has been stored in the authentication database, the electronic device 120 may determine an authentication success. When at least one among identification information of the reference signal and location information of the first external device 110 has not been stored in the authentication database, the electronic device 120 may determine an authentication fail.

Next, the electronic device 120 may request the second external device 130 for notification data in operation 313. For example, the electronic device 120 may request notification data by transmitting, to the second external device 130, at least one among identification information of the reference signal and location information of the first external device 110, together with an authentication result of the reference signal.

Next, the electronic device 120 may receive notification data from the second external device 130 in operation 315. When the authentication result of the reference signal corresponds to an authentication success, the second external device 130 may transmit notification data to the electronic device 120. For example, the notification data may include at least one among an icon, a thumbnail, a text, and address information of information of interest. To this end, the second external device 130 may include a notification database, or may have been connected to the notification database. The second external device 130 may detect notification data from the notification database, based on at least one among identification information of the reference signal and location information of the first external device 110. Through the detection, the second external device 130 may transmit notification data to the electronic device 120. Then, the electronic device 120 may display the notification data in operation 317.

Next, the electronic device 120 may request the second external device 130 for information of interest in operation 319. The electronic device 120 may request the second external device 130 for information of interest based on the notification data. For example, the electronic device 120 may request information of interest by transmitting, to the second external device 130, at least one among identification information of the reference signal and location information of the first external device 110. Alternatively, the electronic device 120 may request information of interest by transmitting, to the second external device 130, at least one among identification information of the reference signal and location information of the first external device 110, together with address information of the information of interest.

Next, the electronic device 120 may receive information of interest from the second external device 130 in operation 321. To this end, the second external device 130 may include an information database, or may have been connected to the information database. The second external device 130 may detect information of interest from the information database, based on at least one among identification information of the reference signal and location information of the first external device 110. Alternatively, the second external device 130 may detect information of interest from the information database, based on address information of the information of interest. Through the detection, the second external device 130 may transmit information of interest to the electronic device 120. Then, the above process may return to the signal flow of FIG. 2.

Figure 4:
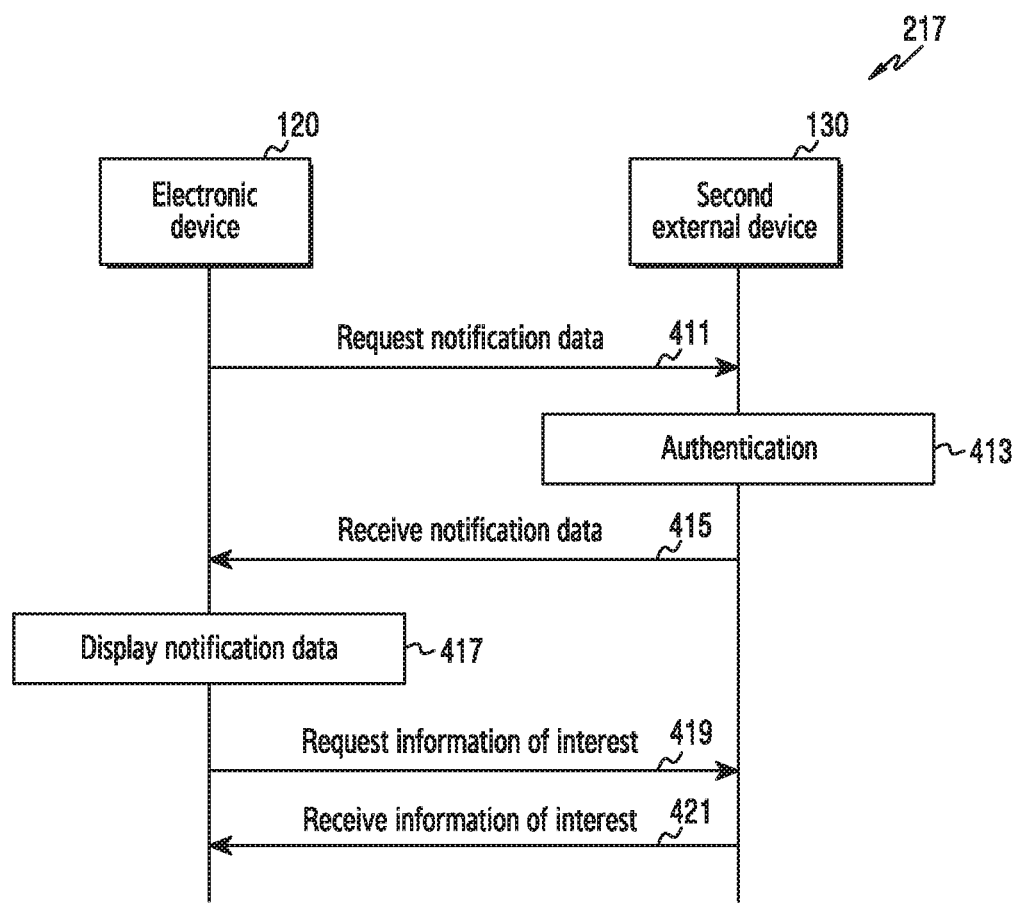
FIG. 4 is a signal flow diagram illustrating a signal flow of the operation of receiving information of interest of FIG. 2.

FIG. 4 is a signal flow diagram illustrating a signal flow of the operation of receiving information of interest of FIG. 2. FIG. 4 illustrates an operation of receiving information of interest according to another embodiment in FIG. 2.

Referring to FIG. 4, the electronic device 120 may request the second external device 130 for notification data in operation 411. For example, the electronic device 120 may detect at least one among identification information and location information of the first external device 110, from a reference signal. Then, the electronic device 120 may request notification data by transmitting, to the second external device 130, at least one among identification information of the reference signal and location information of the first external device 110.

Next, the second external device 130 may perform authentication on the reference signal, in operation 413. For example, the second external device 130 may use the at least one among identification information of the reference signal and location information of the first external device 110, to perform authentication on the reference signal.

Through the authentication, the second external device 130 may obtain an authentication result. The authentication result may indicate at least one among an authentication success and an authentication fail. To this end, the second external device 130 may include an authentication database, or may have been connected to the authentication database. The second external device 130 may determine whether at least one among identification information of the reference signal and location information of the first external device 110 has been stored in the authentication database. When at least one among identification information of the reference signal and location information of the first external device 110 has been stored in the authentication database, the second external device 130 may determine an authentication success. When at least one among identification information of the reference signal and location information of the first external device 110 has not been stored in the authentication database, the second external device 130 may determine an authentication fail.

Next, the electronic device 120 may receive notification data from the second external device 130 in operation 415. When the authentication result of the reference signal corresponds to an authentication success, the second external device 130 may transmit notification data to the electronic device 120. For example, the notification data may include at least one among an icon, a thumbnail, a text, and address information of information of interest. To this end, the second external device 130 may include a notification database, or may have been connected to the notification database. The second external device 130 may detect notification data from the notification database, based on at least one among identification information of the reference signal and location information of the first external device 110. Through the detection, the second external device 130 may transmit the notification data to the electronic device 120. Then, the electronic device 120 may display the notification data in operation 417.

Next, the electronic device 120 may request the second external device 130 for information of interest in operation 419. The electronic device 120 may request the second external device 130 for information of interest based on the notification data. For example, the electronic device 120 may request notification information by transmitting, to the second external device 130, at least one among identification information of the reference signal and location information of the first external device 110. Alternatively, the electronic device 120 may request information of interest by transmitting, to the second external device 130, at least one among identification information of the reference signal and location information of the first external device 110, together with address information of the information of interest.

Next, the electronic device 120 may receive information of interest from the second external device 130 in operation 421. To this end, the second external device 130 may include an information database, or may have been connected to the information database. The second external device 130 may detect information of interest from the information database, based on at least one among identification information of the reference signal and location information of the first external device 110. Alternatively, the second external device 130 may detect information of interest from the information database, based on address information of the information of interest. Through the detection, the second external device 130 may transmit information of interest to the electronic device 120. Then, the above process may return to the signal flow of FIG. 2.

Figure 5:
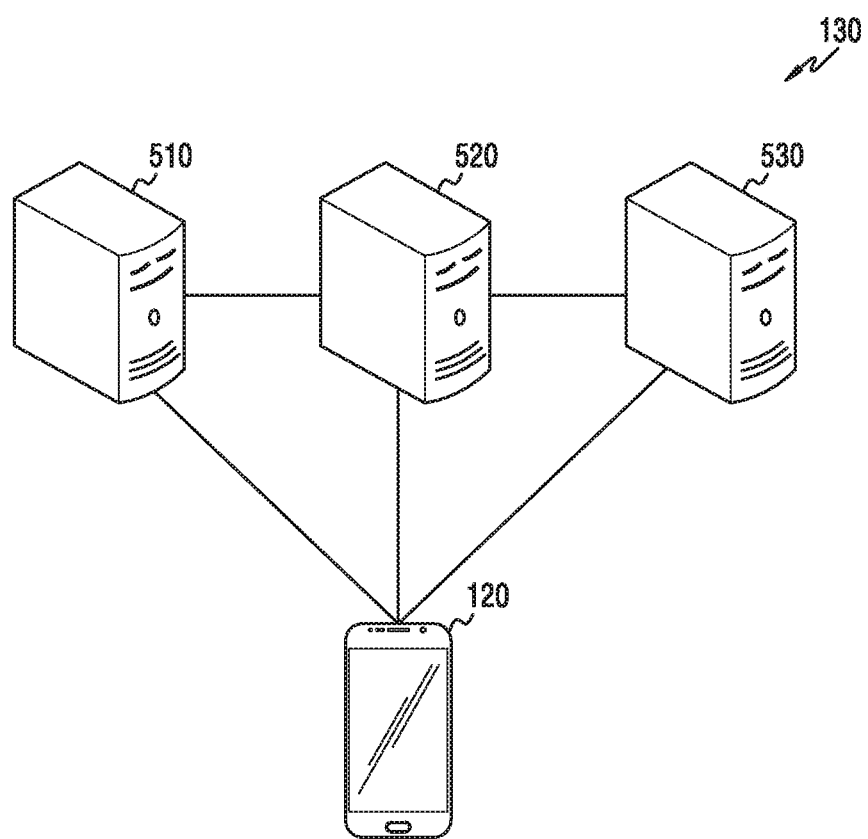
FIG. 5 is a diagram illustrating an example of the second external device of FIG. 2.

FIG. 5 is a diagram illustrating an example of the second external device of FIG. 2. FIG. 5 illustrates a second external device for an operation of receiving information of interest according to another embodiment in FIG. 2.

Referring to FIG. 5, in the communication system 100 according to various embodiments, the second external device 130 may include a plurality of servers 510, 520, and 530. For example, the servers 510, 520, and 530 may include an authentication server 510, a notification server 520, and an information server 530.

The authentication server 510 may perform authentication on a reference signal. For example, the authentication server 510 may perform authentication based on at least one among identification information of a reference signal and location information of the first external device 110.

The notification server 520 may provide the electronic device 120 with notification data. To this end, the notification server 520 may have stored notification data corresponding to a reference signal. When the authentication server 510 has succeeded in authentication, the notification server 520 may provide the electronic device 120 with notification data. For example, the notification data may include at least one among an icon, a thumbnail, a text, and address information of information of interest. To this end, the authentication server 510 and the notification server 520 may directly share an authentication result with each other, or may share the authentication result through the electronic device 120.

The information server 530 may provide the electronic device 120 with information of interest. To this end, the information server 530 may have stored information of interest relating to the notification data. The information server 530 may provide the second electronic device 120 with information of interest based on the notification data.

Figure 6:
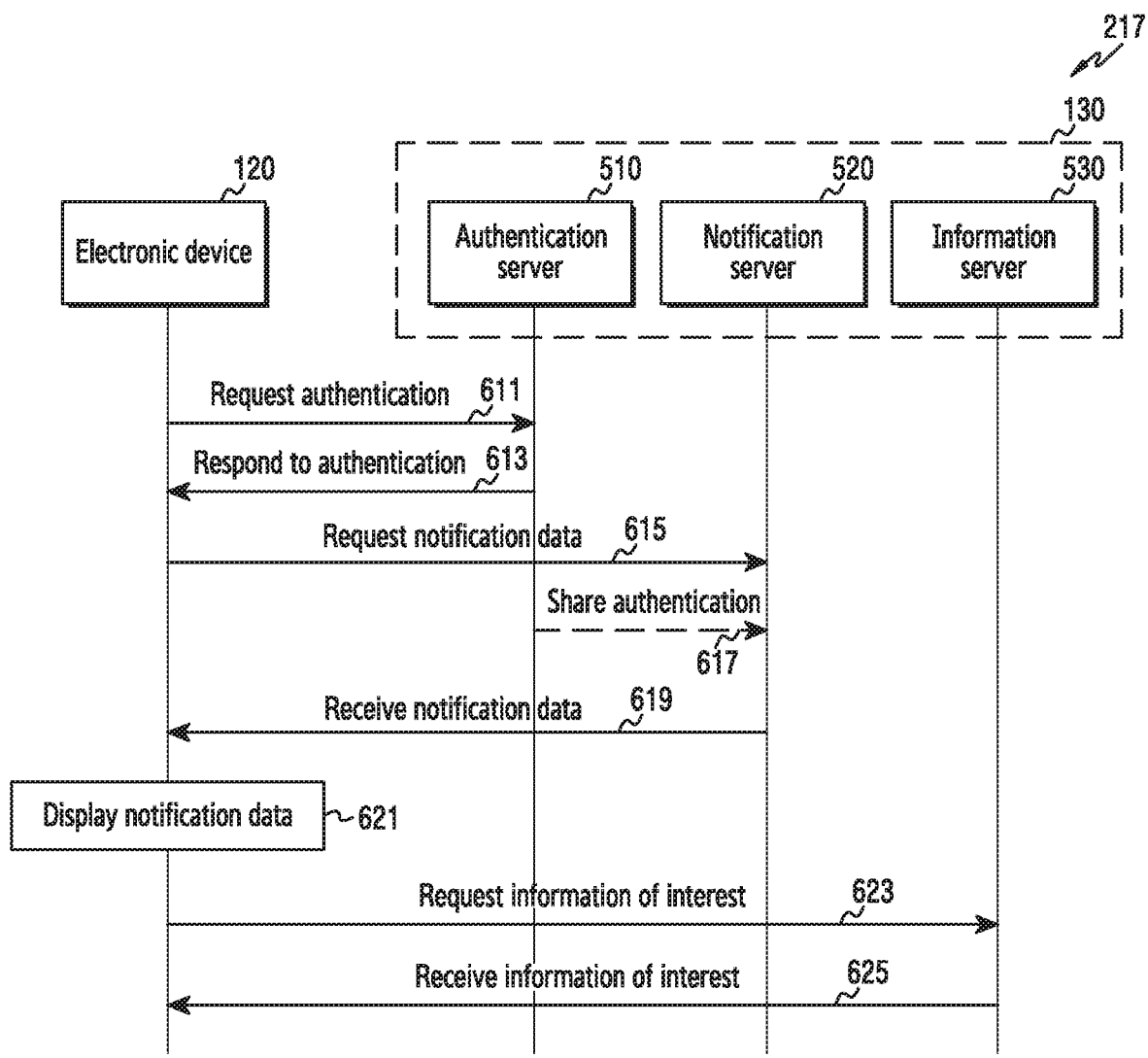
FIG. 6 is a signal flow diagram illustrating a signal flow of the operation of receiving information of interest of FIG. 2.

FIG. 6 is a signal flow diagram illustrating a signal flow of the operation of receiving information of interest of FIG. 2. FIG. 6 illustrates an operation of receiving information of interest according to another embodiment in FIG. 2.

Referring to FIG. 6, in the communication system 100 according to various embodiments, the electronic device 120 may request the authentication server 510 to authenticate a reference signal, in operation 611. For example, the electronic device 120 may detect at least one among identification information and location information of the first external device 110, from a reference signal. Then, the electronic device 120 may transmit, to the authentication server 510, the at least one among identification information of the reference signal and location information of the first external device 110, to request authentication for the reference signal.

Next, the electronic device 120 may receive an authentication result from the authentication server 510, in operation 613. The authentication result may indicate at least one among an authentication success and an authentication fail. For example, the authentication server 510 may perform authentication on at least one among identification information of the reference signal and location information of the first external device 110. To this end, the authentication server 510 may include an authentication database, or may have been connected to the authentication database. The authentication server 510 may determine whether at least one among identification information of the reference signal and location information of the first external device 110 has been stored in the authentication database. When at least one among identification information of the reference signal and location information of the first external device 110 has been stored in the authentication database, the authentication server 510 may determine an authentication success. When at least one among identification information of the reference signal and location information of the first external device 110 has not been stored in the authentication database, the authentication server 510 may determine an authentication fail. Through the determination, the authentication server 510 may transmit an authentication result to the electronic device 120.

Next, the electronic device 120 may request the notification server 520 for notification data in operation 615. For example, the electronic device 120 may request notification data by transmitting, to the notification server 520, at least one among identification information of the reference signal and location information of the first external device 110, together with an authentication result of the reference signal. Alternatively, the electronic device 120 may request notification data by transmitting, to the notification server 520, at least one among identification information of the reference signal and location information of the first external device 110.

According to an embodiment, the authentication server 510 and the notification server 520 may share an authentication result of the reference signal in operation 617. For example, the notification server 520 may transmit, to the authentication server 510, at least one among identification information of the reference signal and location information of the first external device 110, to request an authentication result of the reference signal. In response to the request, the notification server 520 may receive an authentication result of the reference signal from the authentication server 510.

Next, the electronic device 120 may receive notification data from the notification server 520 in operation 619. When the authentication result of the reference signal corresponds to an authentication success, the notification server 520 may transmit notification data to the electronic device 120. For example, the notification data may include at least one among an icon, a thumbnail, a text, and address information of information of interest. To this end, the notification server 520 may include a notification database, or may have been connected to the notification database. Then, the notification server 520 may detect notification data from the notification database, based on at least one among identification information of the reference signal and location information of the first external device 110. Through the detection, the notification server 520 may transmit the notification data to the electronic device 120. Then, the electronic device 120 may display the notification data in operation 621.

Next, the electronic device 120 may request the information server 530 for information of interest in operation 623. The electronic device 120 may request the information server 530 for information of interest based on the notification data. For example, the electronic device 120 may request notification data by transmitting, to the information server 530, at least one among identification information of the reference signal and location information of the first external device 110. Alternatively, the electronic device 120 may request information of interest by transmitting, to the information server 530, at least one among identification information of the reference signal and location information of the first external device 110, together with address information of the information of interest.

Next, the electronic device 120 may receive information of interest from the information server 530 in operation 625. To this end, the information server 530 may include an information database, or may have been connected to the information database. Then, the information server 530 may detect information of interest from the information database, based on at least one among identification information of the reference signal and location information of the first external device 110. Alternatively, the information server 530 may detect information of interest from the information database, based on address information of the information of interest. Through the detection, the information server 530 may transmit the information of interest to the electronic device 120. Then, the above process may return to the signal flow of FIG. 2.

According to various embodiments, the electronic device 120 does not unconditionally receive a reference signal but receives the reference signal in response to an activation signal. That is, the electronic device 120 can receive a reference signal only as needed. Therefore, the power consumption of the electronic device 120 can be decreased. Further, the electronic device 120 is not required to perform an operation, such as changing a configuration, in order to receive a reference signal. Therefore, the electronic device 120 can easily receive information of interest. Accordingly, the operation efficiency of the electronic device 120 can be improved. In addition, the electronic device 120 can detect an activation signal from a simple operation of a user. Therefore, a user convenience with the electronic device 120 can be improved.

Figure 7:
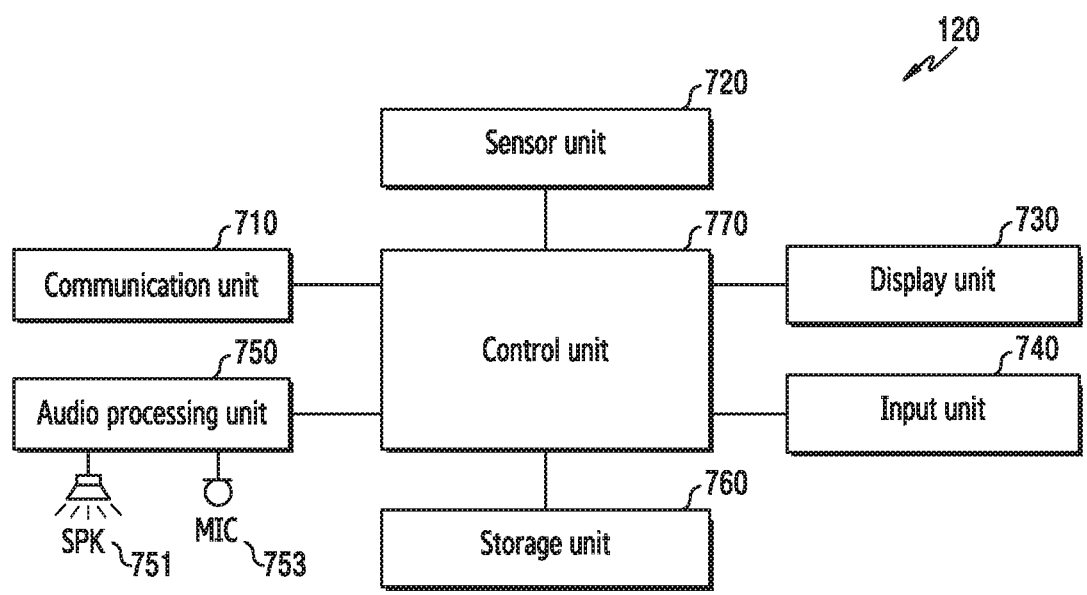
FIG. 7 is a block diagram illustrating an electronic device according to various embodiments.

FIG. 7 is a block diagram illustrating the electronic device 120 according to various embodiments.

Referring to FIG. 7, the electronic device 120 according to various embodiments may include: a communication unit 710; a sensor unit 720; a display unit 730; an input unit 740; an audio processing unit 750; a storage unit 760; and a control unit 770.

The communication unit 710 can perform communication in the electronic device 120. At this time, the communication unit 710 may communicate with an external device through various communication schemes. For example, the communication unit 710 may perform wired or wireless communication. To this end, the communication unit 710 may include at least one antenna. Then, the communication unit 710 may access at least one among a mobile communication network or a data communication network. Otherwise, the communication unit 710 can perform short-range communication. For example, an external device may include at least one among an electronic device, a base station, a server, and a satellite. According to various embodiments, an external device may include at least one among the first external device 110 and the second external device 130 in the communication system 100. A communication scheme may include Long Term Evolution (LTE), Wideband Code Division Multiple Access (WCDMA), a Global System for Mobile communications (GSM), Wi-Fi, a wireless Local Area Network (LAN), ultrasonic, Bluetooth, an Integrated Circuit (IC) chip and Near Field Communication (NFC).

The sensor unit 720 may measure a peripheral physical quantity of the electronic device 120. The sensor unit 720 may measure the state of the electronic device 120. That is, the sensor unit 720 may detect a physical signal. Then, the sensor unit 720 may convert the physical signal into an electrical signal. The sensor unit 720 may include at least one sensor. For example, the sensor unit 720 may include at least one among a gesture sensor, a proximity sensor, an illuminance sensor, a temperature-humidity sensor, a thermal sensor, and a motion sensor.

The display unit 730 may output display data in the electronic device 120. For example, the display unit 730 may include a Liquid Crystal Display (LCD), a Light Emitting Diode (LED) display, an Organic Light Emitting Diode (OLED) display, an Active Matrix Light Emitting Diode (AMOLED) display, Micro Electro Mechanical Systems (MEMS), and an electronic paper display.

The input unit 740 may generate input data in the electronic device 120. The input unit 740 may include at least one input means. For example, the input unit 740 may include at least one among a key pad, a dome switch, a physical button, a touch panel, and a jog & shuttle. Further, the input unit 740 may be combined with the display unit 730 and thus implemented as a touch screen.

The audio processing unit 750 may process an audio signal in the electronic device 120. The audio processing unit 750 may include a speaker (SPK) 751 and a microphone (MIC) 753. That is, the audio processing unit 750 may reproduce an audio signal through the speaker 751. The audio processing unit 750 may collect an audio signal through the microphone 753.

The storage unit 760 may store operation programs of the electronic device 120. The storage unit 760 may store programs for receiving a reference signal in response to an activation signal. Further, the storage unit 760 may store data generated while the programs are executed. For example, the storage unit 760 may include at least one among an internal memory or an external memory. The internal memory may include at least one among a volatile memory (e.g. a DRAM, a SRAM, or a SDRAM), and a non-volatile memory (e.g. a One Time Programmable ROM (OTPROM), a PROM, an EPROM, an EEPROM, a mask ROM, a flash ROM, a flash memory, a hard drive, or a Solid State Drive (SSD)). The external memory may include at least one among a flash drive, a Compact Flash (CF), a Secure Digital (SD), a Micro-SD, a Mini-SD, an extreme Digital (xD), a Multi-Media Card (MMC), or a memory stick.

The control unit 770 may control an overall operation of the electronic device 120. The control unit 770 may perform various functions. To this end, the control unit 770 may control the elements of the electronic device 120. The control unit 770 may receive a command or data from the elements of the electronic device 120 and process the received command or data.

According to various embodiments, the control unit 770 may detect an activation signal. When the electronic device 120 has been turned on, the control unit 770 may detect an activation signal regardless of a current state thereof. For example, the control unit 770 may detect an activation signal in a general power state and may detect an activation signal even in a low power state. The control unit 770 may detect an activation signal in the on-state of the display unit 730, and may detect an activation signal even in the off-state of the display unit 730.

For example, an activation signal may be detected from at least one among an acoustic signal and a movement signal. An acoustic signal may be generated from the microphone 753 by tapping on the electronic device 120, and the control unit 770 may detect an acoustic signal through the audio processing unit 750 and the microphone 753. Then, the control unit 770 may compare the acoustic signal with a predetermined activation condition to detect the acoustic signal, as an activation signal. A movement signal may be generated from the sensor unit 720 by a movement of the electronic device 120, and the control unit 770 may detect a movement signal through the sensor unit 720. Then, the control unit 770 may compare the movement signal with a predetermined movement condition to detect the movement signal, as an activation signal.

According to various embodiments, the control unit 770 may receive a reference signal of the first external device 110. For example, a reference signal may include at least one of intrinsic identification information or location information of the first external device 110. That is, the control unit 770 may receive a reference signal in response to an activation signal. The control unit 770 may receive a reference signal through the communication unit 710.

The control unit 770 may receive the reference signal through a predetermined communication function. For example, the control unit 770 may receive a reference signal through a short-range communication function. To this end, when the communication function has been deactivated, the control unit 770 may activate the communication function in response to an activation signal. When a reference signal is received, the control unit 770 may deactivate the communication function. When the communication function has been activated, the control unit 770 may maintain the communication function even when a reference signal is received. For example, the first external device 110 may periodically broadcast a reference signal, and the control unit 770 may receive the periodically broadcasted reference signal. Alternatively, the control unit 770 may request the first external device 110 for a reference signal and receive the reference signal from the first external device 110 in response to the request.

According to various embodiments, the control unit 770 may receive information of interest based on a reference signal. The control unit 770 may receive information of interest from the second external device 130. For example, the control unit 770 may perform authentication on a reference signal and then obtain a result from the authentication.

Alternatively, the control unit 770 may request the second external device 130 to authenticate a reference signal. Then, the control unit 770 may receive an authentication result from the second external device 130. The control unit 770 may request the second external device 130 for information of interest based on the authentication result, and may receive the information of interest from the second external device 130 in response to the request. Through the reception, the control unit 770 may display the information of interest on the display unit 730.

Figure 8:
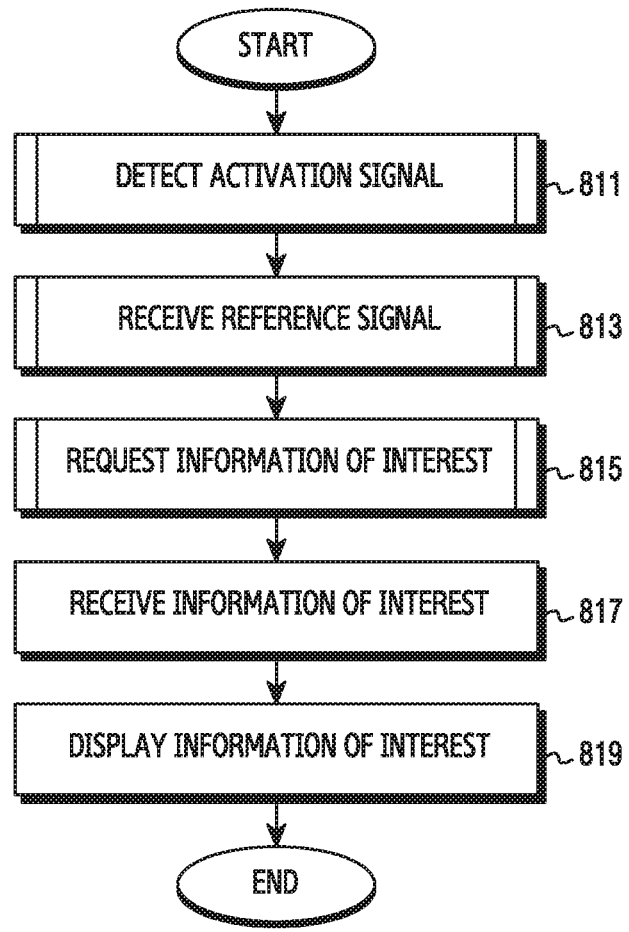
FIG. 8 is a flowchart illustrating an operating method of an electronic device according to various embodiments.

FIG. 8 is a flowchart illustrating an operating method of the electronic device 120 according to various embodiments. Further, FIGS. 15, 16, 17, 18A, 18B, 18C, 18D, 19A, 19B, 19C, and 19D are diagrams for explaining examples of operating methods of the electronic device 120 according to various embodiments.

Referring to FIG. 8, an operating method of the electronic device 120 according to various embodiments may start at operation 811 in which the control unit 770 detects an activation signal. When the electronic device 120 has been turned on, the control unit 770 may detect an activation signal. For example, the control unit 770 may detect an activation signal in a general power state and may detect an activation signal even in a low power state. The control unit 770 may detect an activation signal in the on-state of the display unit 730, and may detect an activation signal even in the off-state of the display unit 730. The activation signal may be detected from at least one among an acoustic signal and a movement signal.

Figure 9:
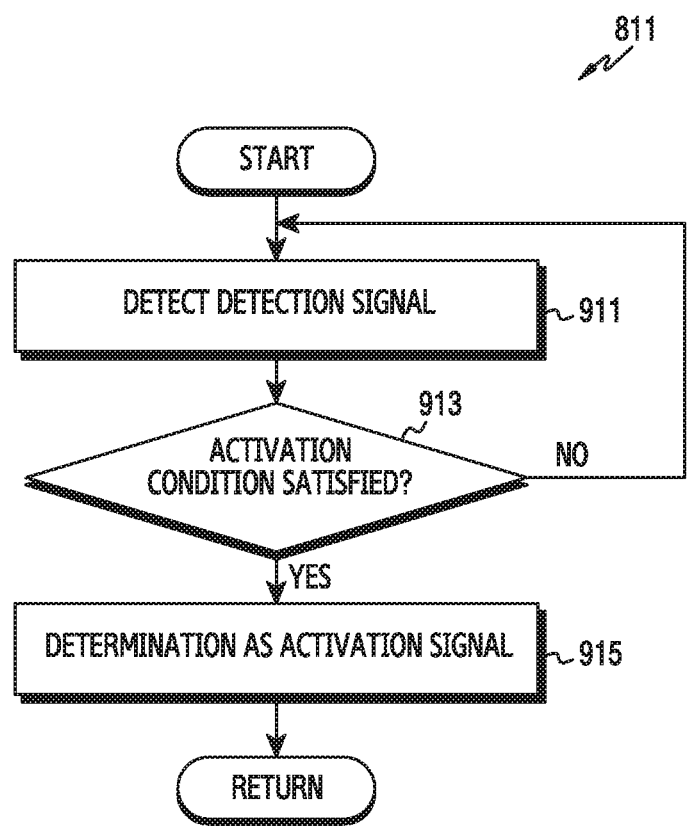
FIG. 9 is a flowchart illustrating the activation signal detecting operation of FIG. 8.

FIG. 9 is a flowchart illustrating the activation signal detecting operation in FIG. 8.

Referring to FIG. 9, the control unit 770 may detect a detection signal in operation 911. The detection signal may include at least one among an acoustic signal and a movement signal. The control unit 770 may detect a detection signal from at least one among the audio processing unit 750 and the sensor unit 740. For example, when the electronic device 120 is in the on-state, at least one among the audio processing unit 750 and the sensor unit 740 may have been activated. In a general power state, both of the audio processing unit 750 and the sensor unit 740 may have been activated and, in a low power state, at least one among the audio processing unit 750 and the sensor unit 740 may have been activated.

Figure 15:
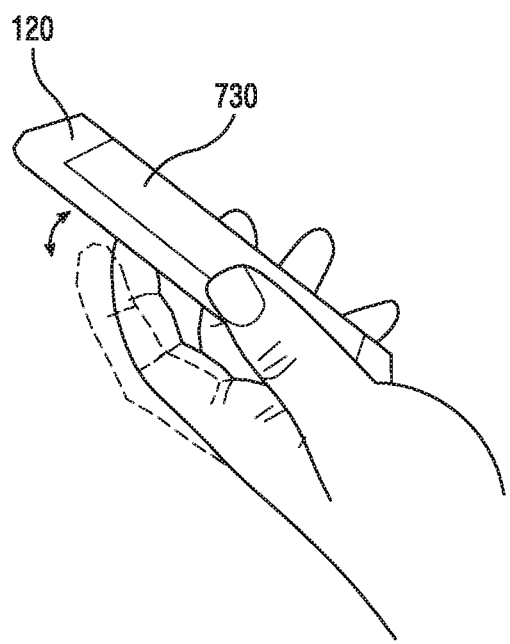
FIGS. 15, 16, 17, 18A, 18B, 18C, 18D, 19A, 19B, 19C, and 19D are diagrams for explaining examples of operating methods of an electronic device according to various embodiments.
Figure 16:
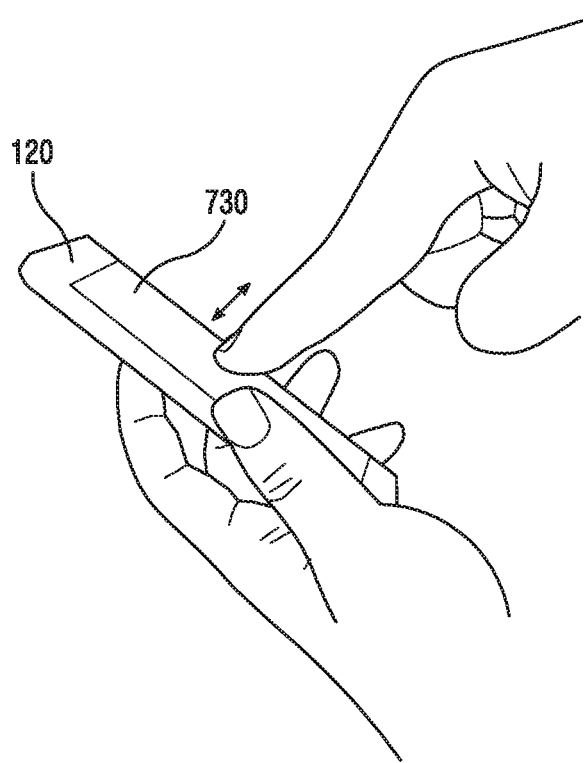

According to an embodiment, the control unit 770 may detect an acoustic signal through the microphone 753 and the audio processing unit 750. For example, as illustrated in FIG. 15, when tapping is incurred on a rear surface of the electronic device 120, the microphone 753 and the audio processing unit 750 may detect the tapping and then generate an acoustic signal. As illustrated in FIG. 16, when tapping is incurred on a front surface of the electronic device 120, the microphone 753 and the audio processing unit 750 may detect the tapping and then generate an acoustic signal. Accordingly, the control unit 770 may detect an acoustic signal from the audio processing unit 750.

Figure 17:
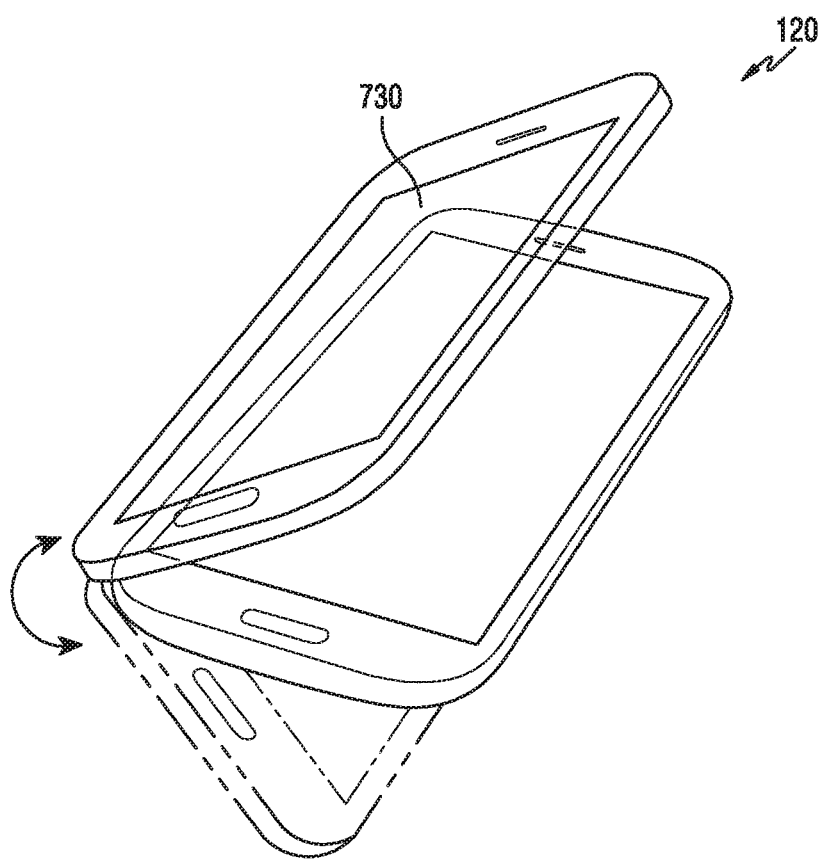

According to another embodiment, the control unit 770 may detect a movement signal through the sensor unit 720. For example, as illustrated in FIG. 17, when a movement of the electronic device 120 occurs, the sensor unit 720 may detect the movement and then generate a movement signal. Accordingly, the control unit 770 may detect a movement signal from the sensor unit 720.

Next, the control unit 770 may compare the detection signal with a predetermined activation condition in operation 913. That is, the control unit 770 may determine whether the detection signal meets the activation condition. For example, the activation condition may include at least one among a signal intensity, the number of detections, the interval of signals, a detection time, or a detection speed. The activation condition may include at least one among an acoustic condition for comparison with an acoustic signal and a movement condition for comparison with a movement signal.

Next, when it is determined that the detection signal meets the activation condition in operation 913, the control unit 770 may determine the detection signal as an activation signal, in operation 915. The control unit 770 may determine at least one among an acoustic signal and a movement signal, as an activation signal. Then, the control unit 770 may return to the operating method of FIG. 8.

According to an embodiment, the control unit 770 may compare an acoustic signal with a predetermined acoustic condition. For example, an acoustic condition may be configured by at least one among the number of taps, the intervals of taps, a tapping speed, and a tapping time. When the acoustic signal meets the acoustic condition, the control unit 770 may detect the acoustic signal as an activation signal.

According to another embodiment, the control unit 770 may compare a movement signal with a predetermined movement condition. For example, a movement condition may be configured by at least one among a movement angle, a movement speed, and a movement time. When the movement signal meets the movement condition, the control unit 770 may detect the movement signal as an activation signal.

Meanwhile, when it is determined that the detection signal does not meet the activation condition, in operation 913, the control unit 770 may return to operation 911. Then, the control unit 770 may ignore the detection signal. Then, the control unit 770 may repeatedly perform at least one among operations 911 to 915.

Figure 10:
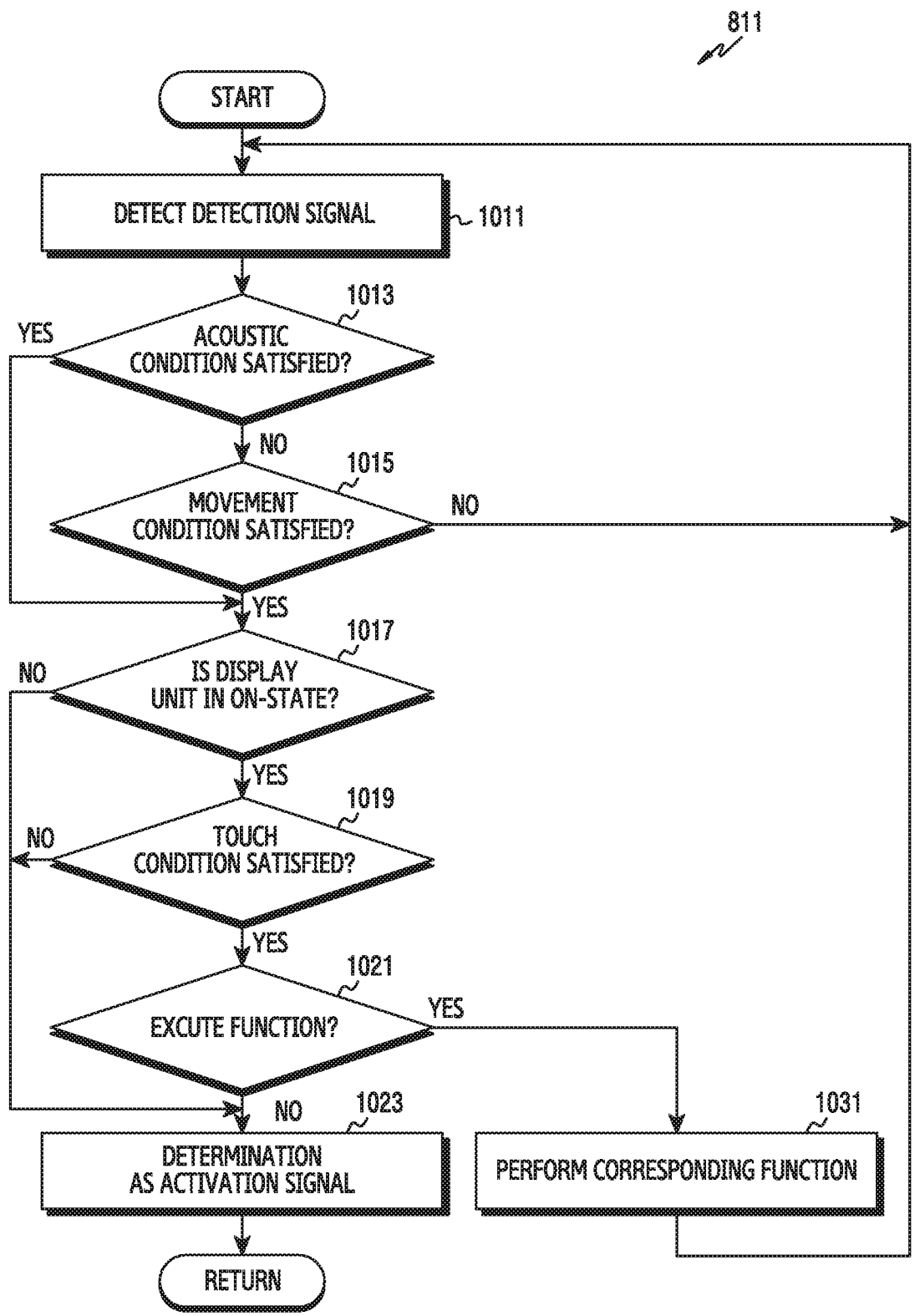
FIG. 10 is a flowchart illustrating the activation signal detecting operation of FIG. 8.

FIG. 10 is a flowchart illustrating the activation signal detecting operation in FIG. 8.

Referring to FIG. 10, the control unit 770 may detect a detection signal in operation 1011. The detection signal may include at least one among an acoustic signal and a movement signal. The control unit 770 may detect a detection signal from at least one among the audio processing unit 750 and the sensor unit 740. For example, when the electronic device 120 is in the on-state, at least one among the audio processing unit 750 and the sensor unit 740 may have been activated. Even in a low power state as well as a general power state, both of the audio processing unit 750 and the sensor unit 740 may have been activated.

Next, the control unit 770 may compare the detection signal with a predetermined acoustic condition in operation 1013. That is, the control unit 770 may determine whether the detection signal meets the acoustic condition. For example, an acoustic condition may be configured by at least one among the number of taps, the intervals of taps, a tapping speed, and a tapping time.

Next, when it is determined that the detection signal does not meet the activation condition, in operation 1013, the control unit 770 may compare the detection signal with a predetermined movement condition, in operation 1015. That is, the control unit 770 may determine whether the detection signal meets the movement condition. For example, a movement condition may be configured by at least one among a movement angle, a movement speed, and a movement time.

Next, when it is determined that the detection signal does not meet the movement condition, in operation 1015, the control unit 770 may return to operation 1011. That is, when it is determined that the detection signal meets the acoustic condition, in operation 1013, and it is determined that the detection signal does not meet the movement condition, in operation 1015, the control unit 770 may return to operation 1011. Then, the control unit 770 may repeatedly perform at least one among operations 1011 to 1015.

Meanwhile, when it is determined that the detection signal meets the acoustic condition, in operation 1013, the control unit 770 may determine whether the display unit 730 has been turned on, in operation 1017. Alternatively, when it is determined that the detection signal meets the movement condition, in operation 1015, the control unit 770 may determine whether the display unit 730 has been turned on, in operation 1017.

Next, when it is determined that the display unit 730 is in the on-state, in operation 1017, the control unit 770 may determine whether the detection signal meets a predetermined touch condition, in operation 1019. Then, the control unit 770 may determine whether a touch signal is detected in response to the detection signal. For example, a touch condition may be configured for detecting a touch signal on the touch screen when both of the display unit 730 and the input unit 740 are implemented as the touch screen. That is, the control unit 770 may determine whether a touch signal is detected along with the detection signal.

Next, when it is determined that the detection signal meets the touch condition, in operation 1019, the control unit 770 may determine whether to execute a function, in operation 1021. Then, the control unit 770 may determine whether the touch signal is for executing a function. For example, when an icon is displayed on the display unit 730, the control unit 770 may determine whether the touch signal is for selecting the icon. Alternatively, when one among a plurality of pages is displayed on the display unit 730, the control unit 770 may determine whether the touch signal is for converting the pages.

Next, when it is determined that the function is not required to be executed, in operation 1021, the control unit 770 may determine the detection signal as an activation signal, in operation 1023. That is, even when the detection signal meets the touch condition, the control unit 770 may determine the detection signal as an activation signal. For example, when the touch signal is not for selecting an icon although the icon is displayed on the display unit 730, the control unit 770 may determine the detection signal as an activation signal. When the touch signal is not for converting pages although one of the pages is displayed on the display unit 730, the control unit 770 may determine the detection signal as an activation signal. Then, the control unit 770 may return to the operating method of FIG. 8.

Next, when it is determined that the display unit 730 is in the off-state, in operation 1017, the control unit 770 may determine the detection signal as an activation signal, in operation 1023. Meanwhile, when it is determined that the detection signal does not meet the touch condition, in operation 1019, the control unit 770 may determine the detection signal as an activation signal, in operation 1023. Then, the control unit 770 may return to the operating method of FIG. 8.

Through the above procedure, in the case where a detection signal is generated in the electronic device 120, even when an object contacts the display unit 730, the control unit 770 may detect an activation signal from the detection signal. For example, as illustrated in FIG. 15, when tapping is incurred on the rear surface of the electronic device 120, the control unit 770 may detect an activation signal from an acoustic signal corresponding to the tapping. As illustrated in FIG. 16, even when tapping is incurred on the front surface of the electronic device 120, the control unit 770 may detect an activation signal from an acoustic signal corresponding to the tapping. As illustrated in FIG. 17, when a movement of the electronic device 120 occurs, the control unit 770 may detect an activation signal from a movement signal corresponding to the movement.

When it is determined that a function should be executed, in operation 1021, the control unit 770 may perform the corresponding function, in operation 1031. That is, the control unit 770 may perform the corresponding function based on the touch signal. The control unit 770 may ignore the detection signal. For example, when an icon is displayed on the display unit 730, the control unit 770 may select the icon in response to the touch signal and call an application allocated for the icon. Alternatively, when one among pages is displayed on the display unit 730, the control unit 770 may convert the pages in response to the touch signal and display another page among the pages. Then, the control unit 770 may return to operation 1011. Then, the control unit 770 may repeatedly perform at least one among operations 1011 to 1031.

Next, the control unit 770 may receive a reference signal of the first external device 110, in operation 813. For example, a reference signal may include at least one of intrinsic identification information or location information of the first external device 110. That is, the control unit 770 may receive a reference signal in response to an activation signal. The control unit 770 may receive the reference signal through the communication unit 710. The control unit 770 may receive the reference signal through a predetermined communication function. For example, the control unit 770 may receive a reference signal through a short-range communication function. The communication function may include at least one among Wi-Fi, ultrasonic communication, Bluetooth, an IC chip, or NFC.

Figure 11:
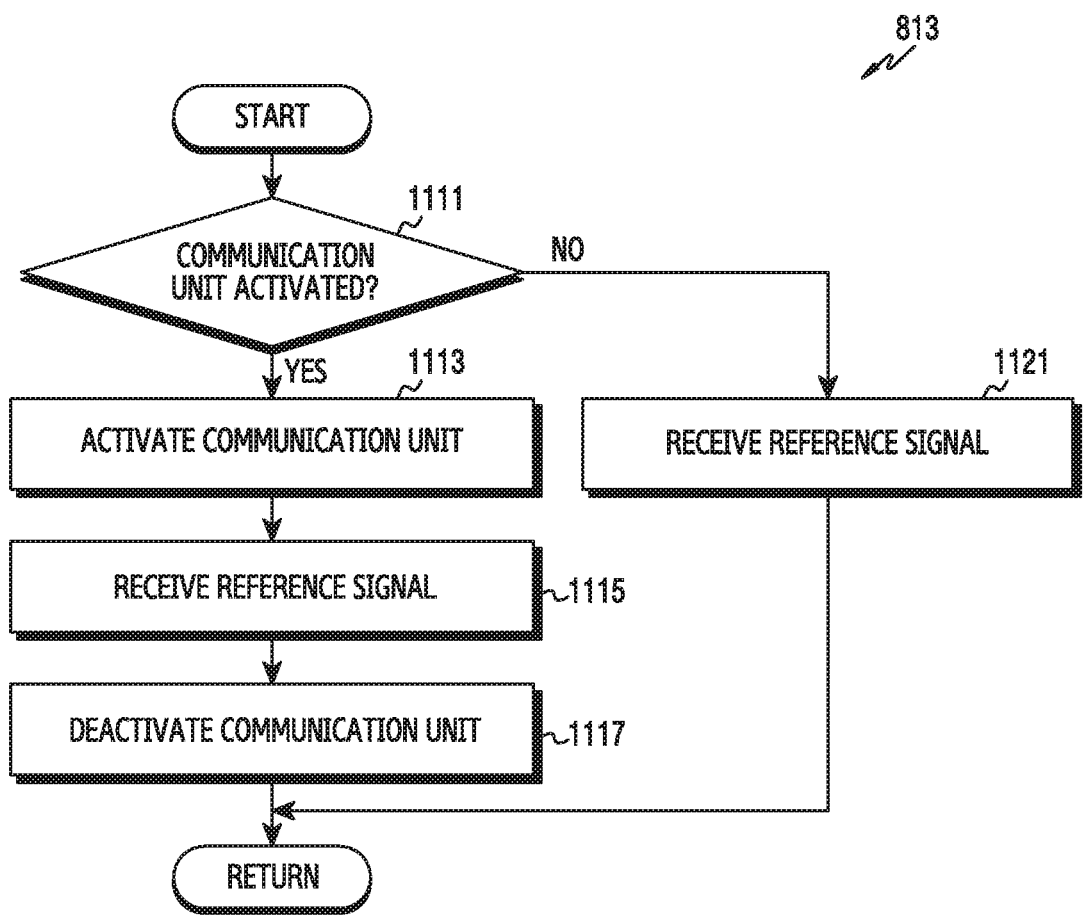
FIG. 11 is a flowchart illustrating the reference signal receiving operation of FIG. 8.

FIG. 11 is a flowchart illustrating the reference signal receiving operation in FIG. 8.

Referring to FIG. 11, the control unit 770 may determine whether to activate the communication unit 710, in operation 1111. Then, the control unit 770 may determine whether the communication unit 710 has been activated. That is, the control unit 770 may determine whether a predetermined communication function has been activated in the communication unit 710. For example, the control unit 770 may determine whether a short-range communication function has been activated.

Next, when it is determined that the communication unit 710 should be activated, in operation 1111, the control unit 770 may activate the communication unit 710, in operation 1113. When the predetermined communication function has been deactivated in the communication unit 710, the control unit 770 may activate a communication function in the communication unit 710. For example, when a short-range communication function has been deactivated, the control unit 770 may activate the short-range communication function.

Next, the control unit 770 may receive a reference signal through the communication unit 710, in operation 1115. The control unit 770 may receive the reference signal through a predetermined communication function in the communication unit 710. For example, the control unit 770 may receive the reference signal through a short-range communication function. The first external device 110 may periodically broadcast a reference signal, and the control unit 770 may receive the periodically broadcasted reference signal. Alternatively, the control unit 770 may request the first external device 110 for a reference signal and receive the reference signal from the first external device 110 in response to the request. For example, a reference signal may include at least one of intrinsic identification information or location information of the first external device 110.

Next, the control unit 770 may deactivate the communication unit 710, in operation 1117. The control unit 770 may deactivate a predetermined communication function in the communication unit 710. For example, the control unit 770 may deactivate a short-range communication function. Then, the control unit 770 may return to the operating method of FIG. 8.

Meanwhile, when it is determined that the communication unit 710 is not required to be activated, in operation 1111, the control unit 770 may receive a reference signal, in operation 1121. When the predetermined communication function has been activated in the communication unit 710, the control unit 770 may receive the reference signal through the communication function. For example, when a short-range communication function has been activated, the control unit 770 may receive the reference signal through the short-range communication. The first external device 110 may periodically broadcast a reference signal, and the control unit 770 may receive the periodically broadcasted reference signal. Alternatively, the control unit 770 may request the first external device 110 for a reference signal and receive the reference signal from the first external device 110 in response to the request. For example, a reference signal may include at least one of intrinsic identification information or location information of the first external device 110. Then, the control unit 770 may return to the method of FIG. 21. That is, even when the reference signal is received, the control unit 770 may not deactivate the predetermined communication function in the communication unit 710. For example, even when a reference signal is received, the control unit 770 may maintain the short-range communication function.

Subsequently, the control unit 770 may request information of interest, in operation 815. The control unit 770 may request the second external device 130 for information of interest. The control unit 770 may request information of interest based on a reference signal.

According to an embodiment, the control unit 770 may receive information of interest from the second external device 130 even when the control unit 770 does not perform an authentication procedure on a reference signal. For example, when a communication function is an IC chip or NFC, the control unit 770 may not perform an authentication procedure on a reference signal. This is because, when the short-range communication function is an IC chip or NFC, the control unit 770 may receive a reference signal from the second external device 130 as the electronic device 120 approaches the second external device 130. Through the reception, the control unit 770 may use the reference signal to request the second external device 130 for information of interest.

Figure 12:
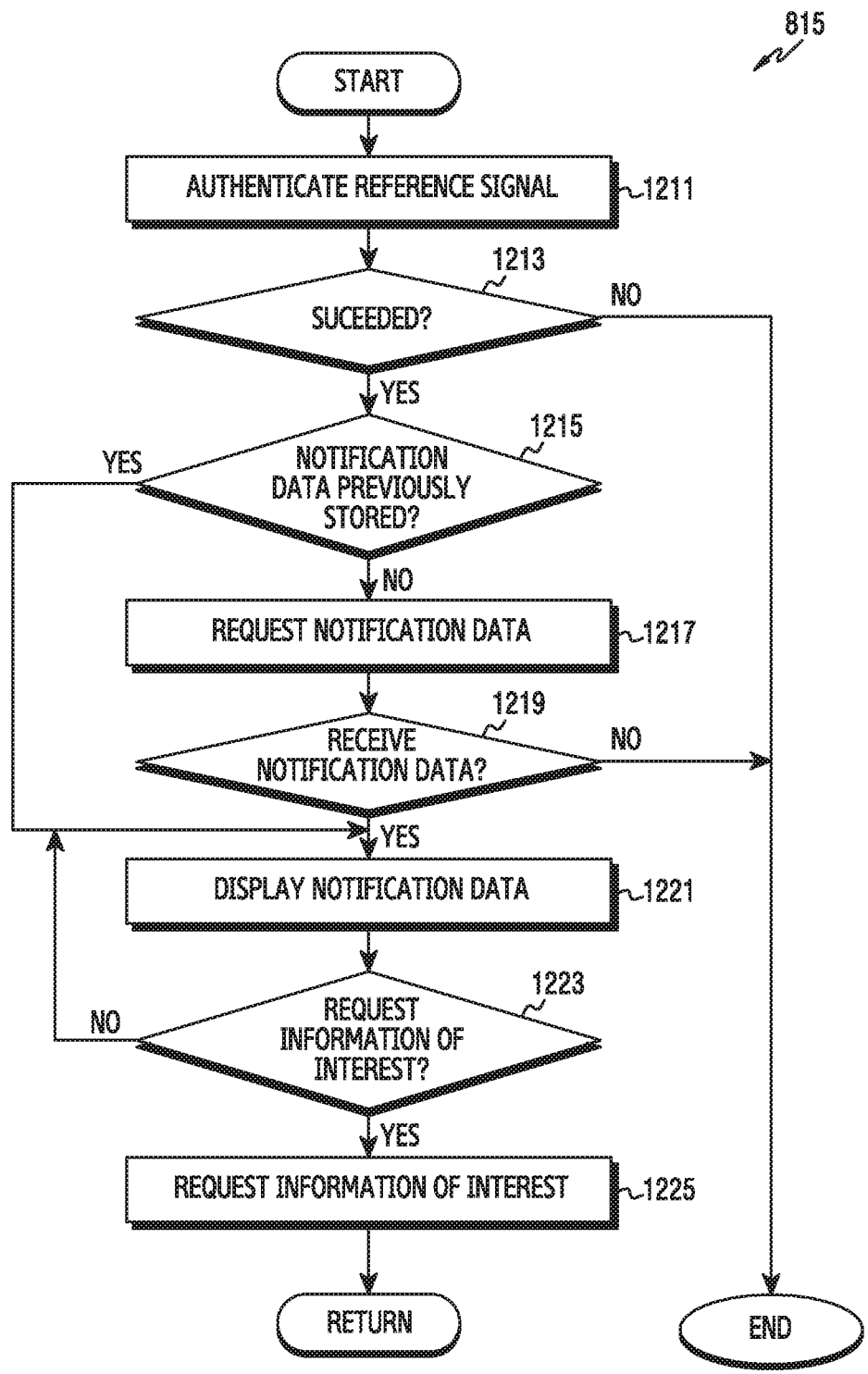
FIG. 12 is a flowchart illustrating the operation of requesting information of interest of FIG. 8.
Figure 13:
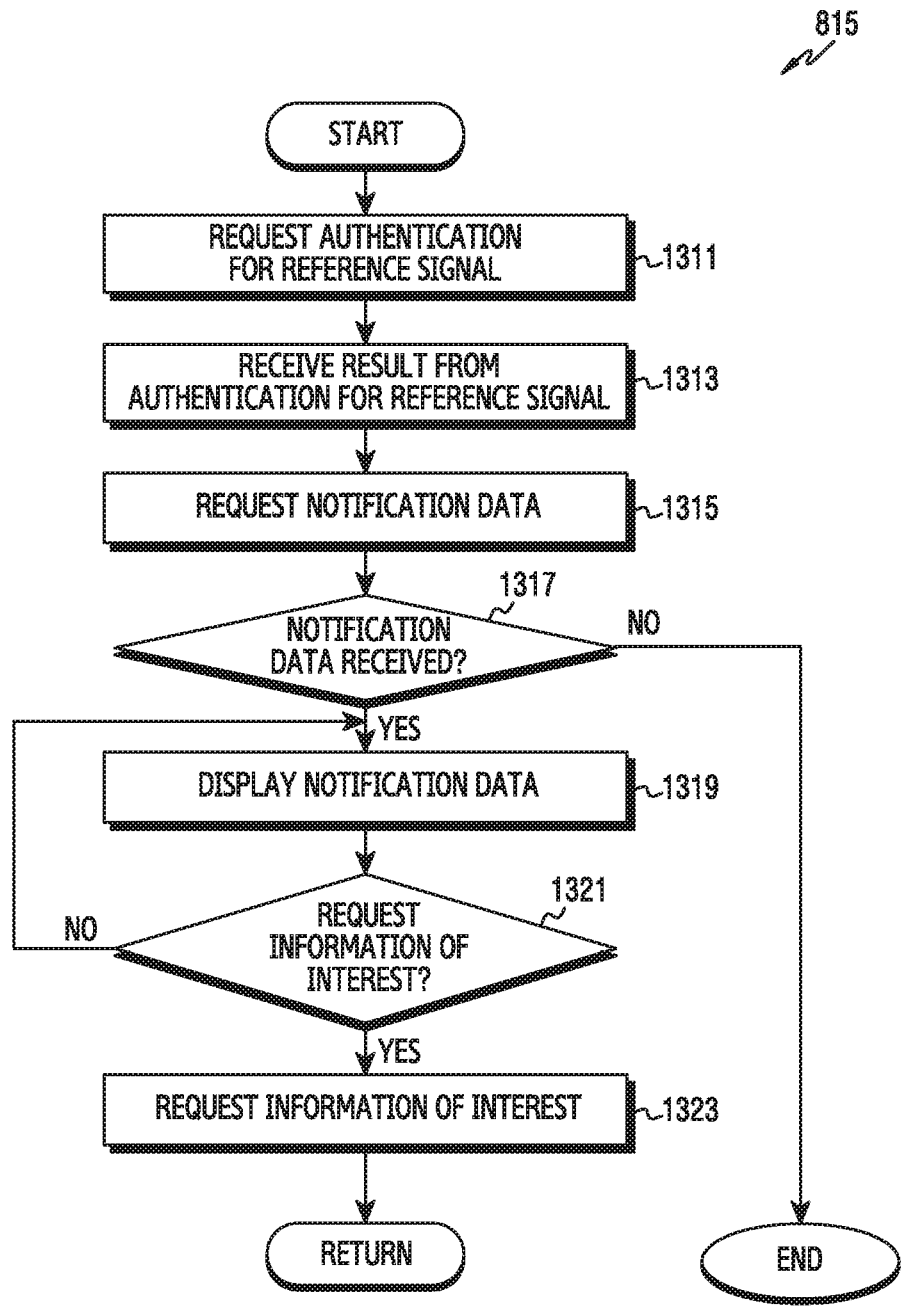
FIG. 13 is a flowchart illustrating the operation of requesting information of interest of FIG. 8.
Figure 14:
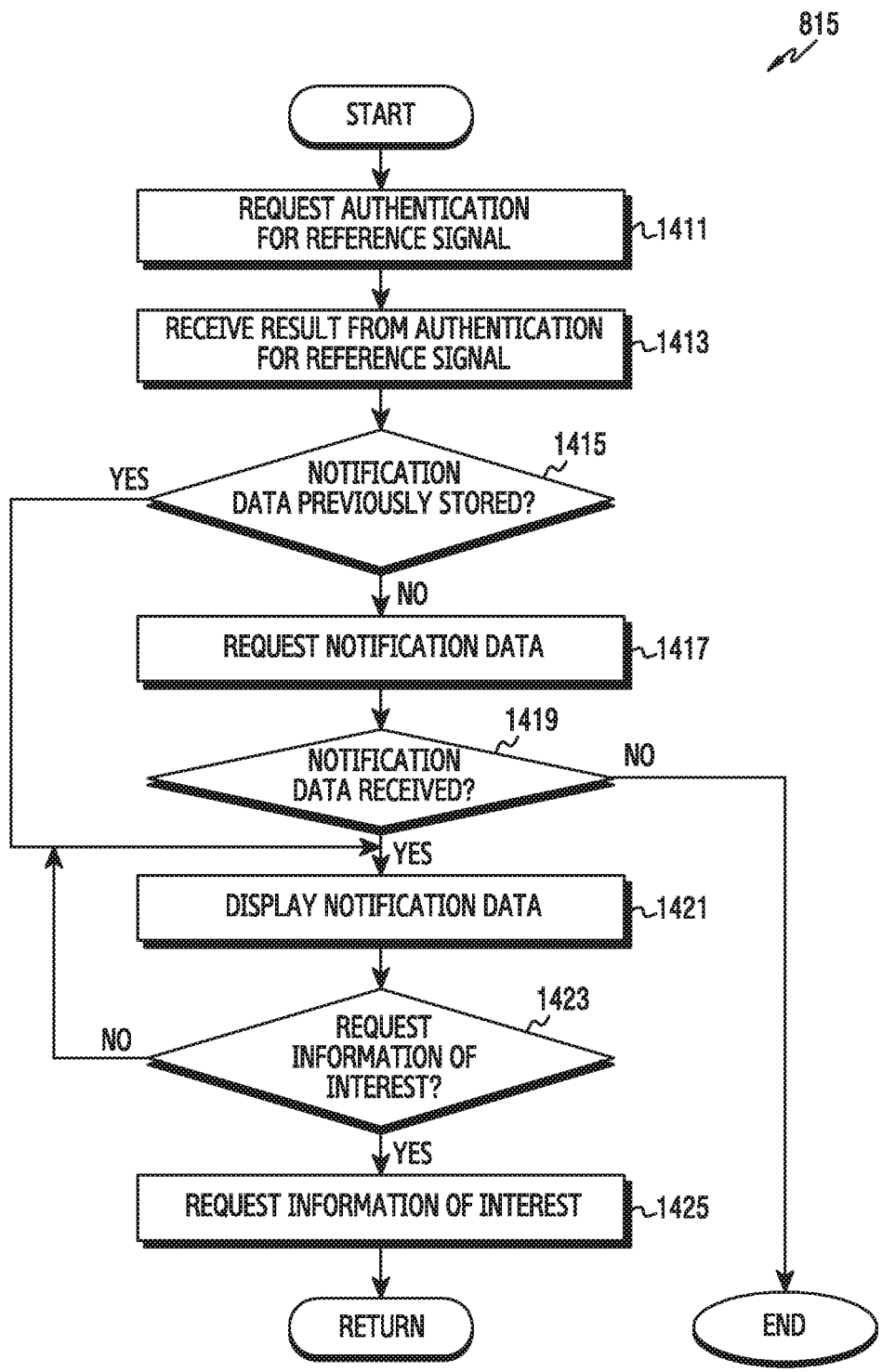
FIG. 14 is a flowchart illustrating the operation of requesting information of interest of FIG. 8.

According to another embodiment, the control unit 770 may perform an authentication procedure on a reference signal and receive information of interest from the second external device 130 according to the result therefrom. For example, the control unit 770 may directly perform authentication on a reference signal and then obtain a result from the authentication. Alternatively, the control unit 770 may request the second external device 130 to authenticate a reference signal. Then, the control unit 770 may receive an authentication result from the second external device 130. Further, the control unit 770 may request the second external device 130 for information of interest, based on the authentication result. With reference to FIGS. 12, 13, and 14, an operation of requesting information of interest according to another embodiment will be described in detail.

FIG. 12 is a flowchart illustrating the operation of requesting information of interest in FIG. 8. FIG. 12 illustrates an operation of requesting information of interest according to another embodiment in FIG. 8.

Referring to FIG. 12, the control unit 770 may perform authentication on a reference signal, in operation 1211. For example, the control unit 770 may detect at least one among identification information and location information of the first external device 110, from a reference signal. Then, the control unit 770 may use the at least one among identification information of the reference signal and location information of the first external device 110, to perform authentication on the reference signal. Through the authentication, the control unit 770 may obtain an authentication result. The authentication result may indicate at least one among an authentication success and an authentication fail.

To this end, the storage unit 760 may include an authentication database, and the control unit 770 may have been connected to an authentication database located outside the electronic device 120. Further, the control unit 770 may use the authentication database to perform authentication on the reference signal. The control unit 770 may determine whether at least one among identification information of the reference signal and location information of the first external device 110 has been stored in the authentication database.

Next, the control unit 770 may determine whether the authentication on the reference signal has succeeded, in operation 1213. When at least one among identification information of the reference signal and location information of the first external device 110 has been stored in the authentication database, the control unit 770 may determine an authentication success. Meanwhile, when at least one among identification information of the reference signal and location information of the first external device 110 has not been stored in the authentication database, the control unit 770 may determine an authentication fail.

Next, when it is determined that the authentication on the reference signal has succeeded, in operation 1213, the control unit 770 may determine whether notification data corresponding to the reference signal has been previously stored, in operation 1215. The control unit 770 may previously download notification data from the second external device 130, and the storage unit 760 may have stored the notification data.

To this end, the storage unit 760 may include a notification database, and the control unit 770 may have been connected to a notification database located outside the electronic device 120. The control unit 770 may determine whether notification data corresponding to the reference signal has been stored in the notification database. The control unit 770 may determine whether notification data corresponding to at least one among identification information of the reference signal and location information of the first external device 110 has been stored in the notification database.

Next, when it is determined that notification data has been stored, in operation 1215, the control unit 770 may display the notification data, in operation 1221. The control unit 770 may display the notification data on the display unit 730. For example, the notification data may include at least one among an icon, a thumbnail, a text, and address information of information of interest.

Meanwhile, when it is determined that notification data has not been stored, in operation 1215, the control unit 770 may request the second external device 130 for notification data, in operation 1217. For example, the control unit 770 may request notification data by transmitting, to the second external device 130, at least one among identification information of a reference signal and location information of the first external device 110, together with an authentication result of the reference signal. Then, when notification data is received from the second external device 130, the control unit 770 may detect the reception, in operation 1219. Then, the control unit 770 may display the notification data, in operation 1221. The control unit 770 may display the notification data on the display unit 730.

Next, the control unit 770 may determine whether to request information of interest, in operation 1223. The control unit 770 may determine whether to request information of interest, based on the selection of a user. For example, when the selection of a user is detected in the notification data, the control unit 770 may determine whether to request information of interest, based on the selection of the user.

Next, when it is determined that information of interest is required to be requested, in operation 1223, the control unit 770 may request the second external device 130 for information of interest, in operation 1225. The electronic device 120 may request the second external device 130 for information of interest based on the notification data. For example, the electronic device 120 may request information of interest by transmitting, to the second external device 130, at least one among identification information of the reference signal and location information of the first external device 110. Alternatively, the electronic device 120 may request information of interest by transmitting, to the second external device 130, at least one among identification information of the reference signal and location information of the first external device 110, together with address information of the information of interest. Then, the control unit 770 may return to the operating method of FIG. 8.

Meanwhile, when it is determined that the authentication on the reference signal has failed, in operation 1213, the control unit 770 may terminate the operating method of the electronic device 120. Alternatively, when notification data is not received in operation 1219, the control unit 770 may terminate the operating method of the electronic device 120.

FIG. 13 is a flowchart illustrating the operation of requesting information of interest in FIG. 8. FIG. 13 illustrates an operation of requesting information of interest according to another embodiment in FIG. 8.

Referring to FIG. 13, the control unit 770 may request the second external device 130 to authenticate a reference signal, in operation 1311. To this end, the control unit 770 may transmit at least one of identification information of the reference signal and location information of the corresponding external device. Then, the control unit 770 may receive an authentication result of the reference signal, in operation 1313. The control unit 770 may receive an authentication result of the reference signal from the second external device 130. The authentication result may indicate at least one among an authentication success and an authentication fail.

Next, the control unit 770 may request the second external device 130 for notification data in operation 1315. To this end, the control unit 770 may transmit at least one of identification information of the reference signal and location information of the corresponding external device, together with the authentication result of the reference signal. Alternatively, the control unit 770 may transmit at least one of identification information of the reference signal and location information of the corresponding external device.

Next, when notification data is received, the control unit 770 may detect the reception of the notification data, in operation 1317. When an authentication result of the reference signal corresponds to an authentication success, the control unit 770 may receive notification data from the second external device 130. Then, the control unit 770 may display the notification data, in operation 1319. The control unit 770 may display the notification data on the display unit 730. For example, the notification data may include at least one among an icon, a thumbnail, a text, and address information of information of interest.

Next, the control unit 770 may determine whether to request information of interest, in operation 1321. The control unit 770 may determine whether to request information of interest, based on the selection of a user. For example, when the selection of a user is detected in the notification data, the control unit 770 may determine whether to request information of interest, based on the selection of the user.

Next, when it is determined that information of interest is required to be requested, in operation 1321, the control unit 770 may request the second external device 130 for the information of interest, in operation 1323. The electronic device 120 may request the second external device 130 for information of interest based on the notification data. For example, the electronic device 120 may request information of interest by transmitting, to the second external device 130, at least one among identification information of the reference signal and location information of the first external device 110. Alternatively, the electronic device 120 may request information of interest by transmitting, to the second external device 130, at least one among identification information of the reference signal and location information of the first external device 110, together with address information of the information of interest. Then, the control unit 770 may return to the operating method of FIG. 8.

Alternatively, when notification data is not received in operation 1317, the control unit 770 may terminate the operating method of the electronic device 120.

FIG. 14 is a flowchart illustrating the operation of requesting information of interest in FIG. 8. FIG. 14 illustrates an operation of requesting information of interest according to another embodiment in FIG. 8.

Referring to FIG. 14, the control unit 770 may request the second external device 130 to authenticate a reference signal, in operation 1411. To this end, the control unit 770 may transmit at least one of identification information of the reference signal and location information of the corresponding external device. Then, the control unit 770 may receive an authentication result of the reference signal, in operation 1413. The control unit 770 may receive an authentication result of the reference signal from the second external device 130. The authentication result may indicate at least one among an authentication success and an authentication fail.

The control unit 770 may determine whether notification data corresponding to the reference signal has been stored, in operation 1415. The control unit 770 may previously download notification data from the second external device 130, and the storage unit 760 may have stored the notification data.

To this end, the storage unit 760 may include a notification database, and the control unit 770 may have been connected to a notification database located outside the electronic device 120. The control unit 770 may determine whether notification data corresponding to the reference signal has been stored in the notification database. The control unit 770 may determine whether notification data corresponding to at least one among identification information of the reference signal and location information of the first external device 110 has been stored in the notification database.

Next, when it is determined that notification data has been stored, in operation 1415, the control unit 770 may display the notification data, in operation 1421. The control unit 770 may display the notification data on the display unit 730. For example, the notification data may include at least one among an icon, a thumbnail, a text, and address information of information of interest.

Meanwhile, when it is determined that notification data has not been stored, in operation 1415, the control unit 770 may request the second external device 130 for notification data, in operation 1417. For example, the control unit 770 may request notification data by transmitting, to the second external device 130, at least one among identification information of the reference signal and location information of the first external device 110, together with an authentication result of the reference signal. Then, when notification data is received from the second external device 130, the control unit 770 may detect the reception, in operation 1419. Then, the control unit 770 may display the notification data, in operation 1421. The control unit 770 may display the notification data on the display unit 730.

Next, the control unit 770 may determine whether to request information of interest, in operation 1423. The control unit 770 may determine whether to request information of interest, based on the selection of a user. For example, when the selection of a user is detected in the notification data, the control unit 770 may determine whether to request information of interest, based on the selection of the user.

Next, when it is determined that information of interest is required to be requested, in operation 1423, the control unit 770 may request the second external device 130 for the information of interest, in operation 1425. The electronic device 120 may request the second external device 130 for information of interest based on the notification data. For example, the electronic device 120 may request information of interest by transmitting, to the second external device 130, at least one among identification information of the reference signal and location information of the first external device 110. Alternatively, the electronic device 120 may request information of interest by transmitting, to the second external device 130, at least one among identification information of the reference signal and location information of the first external device 110, together with address information of the information of interest. Then, the control unit 770 may return to the operating method of FIG. 8.

Meanwhile, when notification data is not received in operation 1419, the control unit 770 may terminate the operating method of the electronic device 120.

Lastly, the control unit 770 may receive information of interest, in operation 817. The control unit 770 may receive information of interest from the second external device 130. Then, the control unit 770 may display the information of interest, in operation 819. The control unit 770 may display the information of interest on the display unit 730. Then, the control unit 770 may terminate the operating method of the electronic device 120.

Figure 18A:
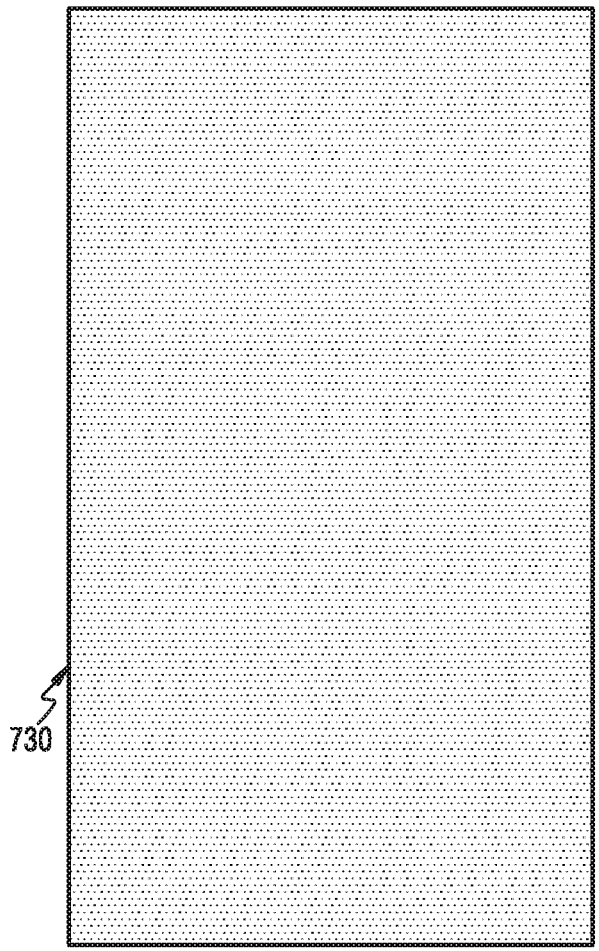
Figure 18B:
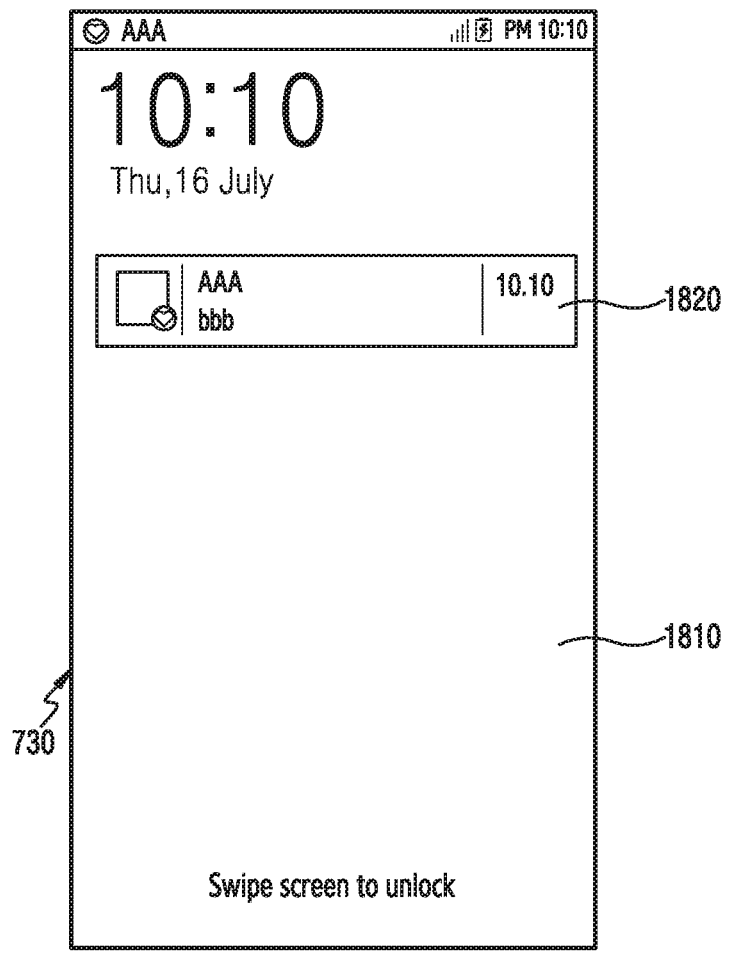
Figure 18C:
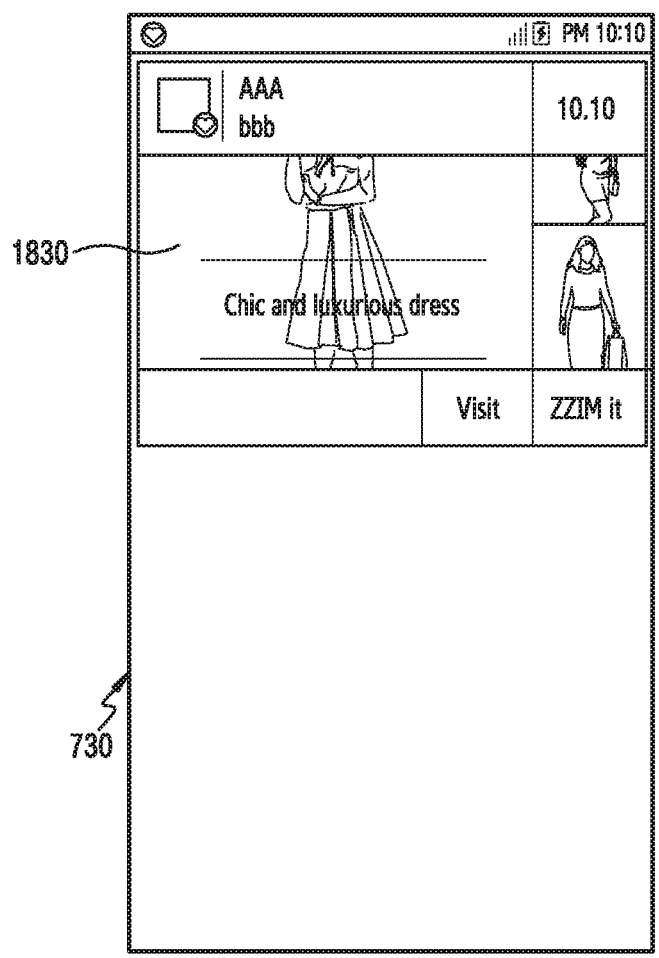
Figure 18D:
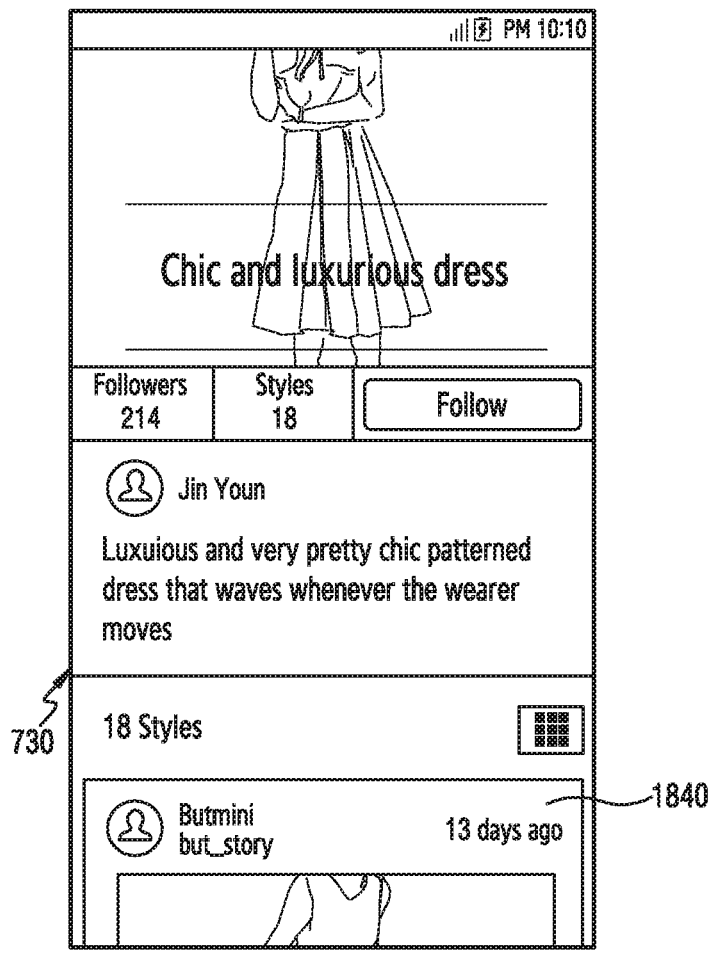

According to an embodiment, the control unit 770 may detect an activation signal in the state where the display unit 730 is in the off-state, as illustrated in FIG. 18A. Through the detection, the control unit 770 may receive a reference signal in response to an activation signal. Then, the control unit 770 may display notification data corresponding to the reference signal, as illustrated in FIG. 18B. To this end, the control unit 770 may turn on the display unit 730 and display a lock screen 1810. Then, the control unit 770 may display a notification window 1820 of the notification data on the lock screen 1810. The control unit 770 may display a partial content of the notification data on the notification window 1820. For example, the control unit 770 may display a web page address on the notification window 1820. When a touch gesture for enlarging the notification window 1820 is detected, the control unit 770 may display a notification screen 1830 of the notification data, as illustrated in FIG. 18C. The control unit 770 may display the entire content of the notification data on the notification screen 1830. Also, when a touch gesture for requesting information of interest is sensed through the notification window 1820 or the notification screen 1830, the control unit 770 may display an information screen 1840, as illustrated in FIG. 18D. The control unit 770 may display information of interest on the information screen 1840. For example, the information screen 1840 may be a web page including information of interest.

Figure 19A:
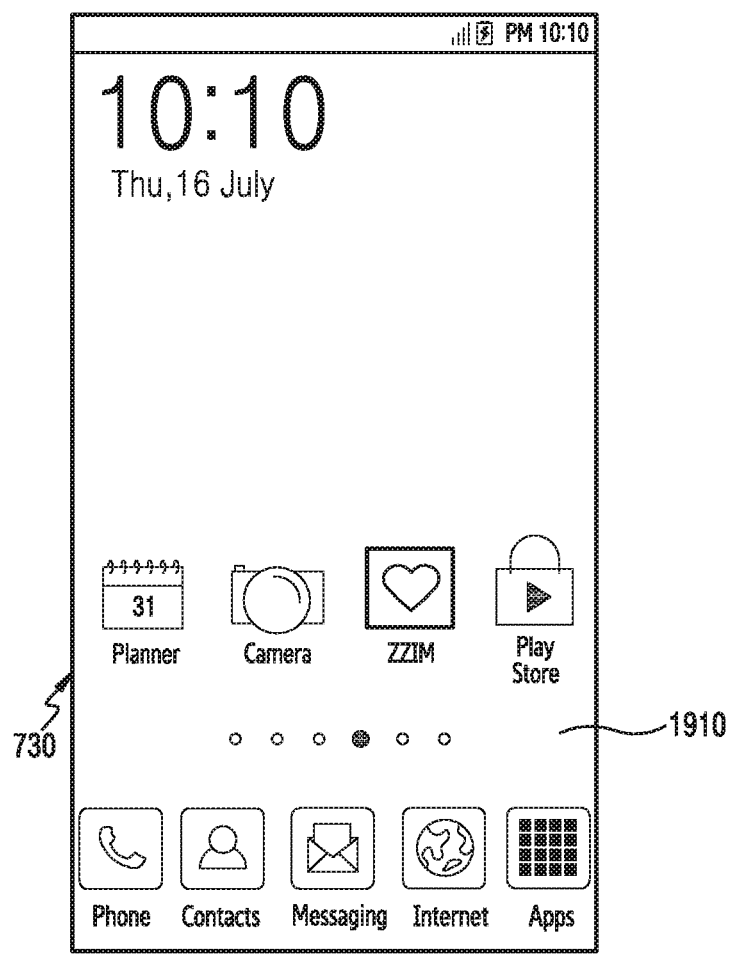
Figure 19B:
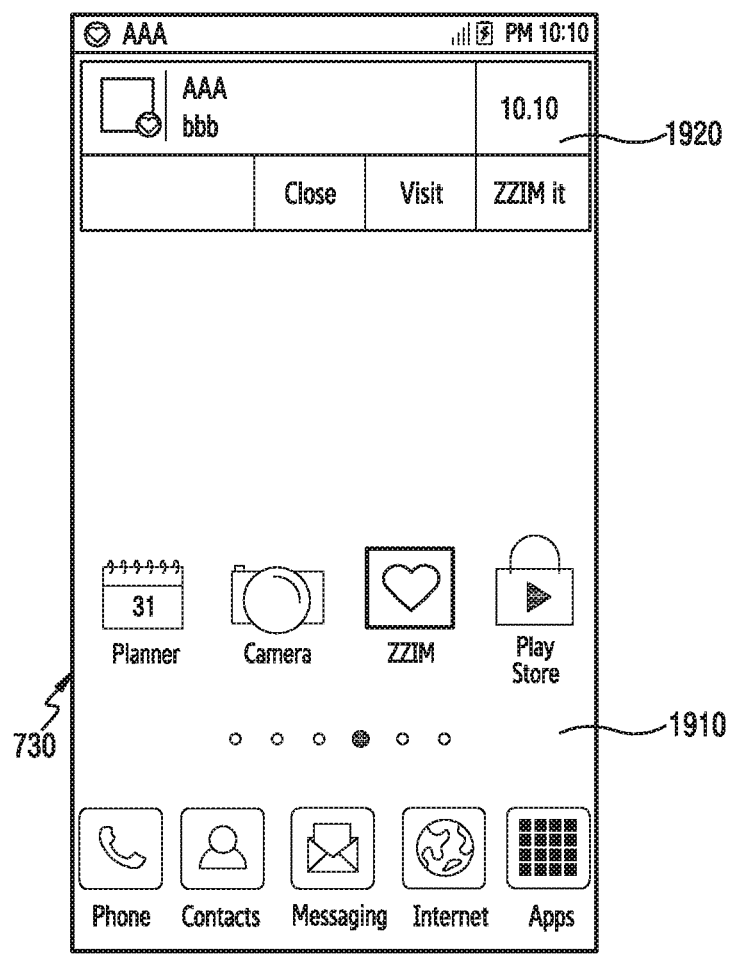
Figure 19C:
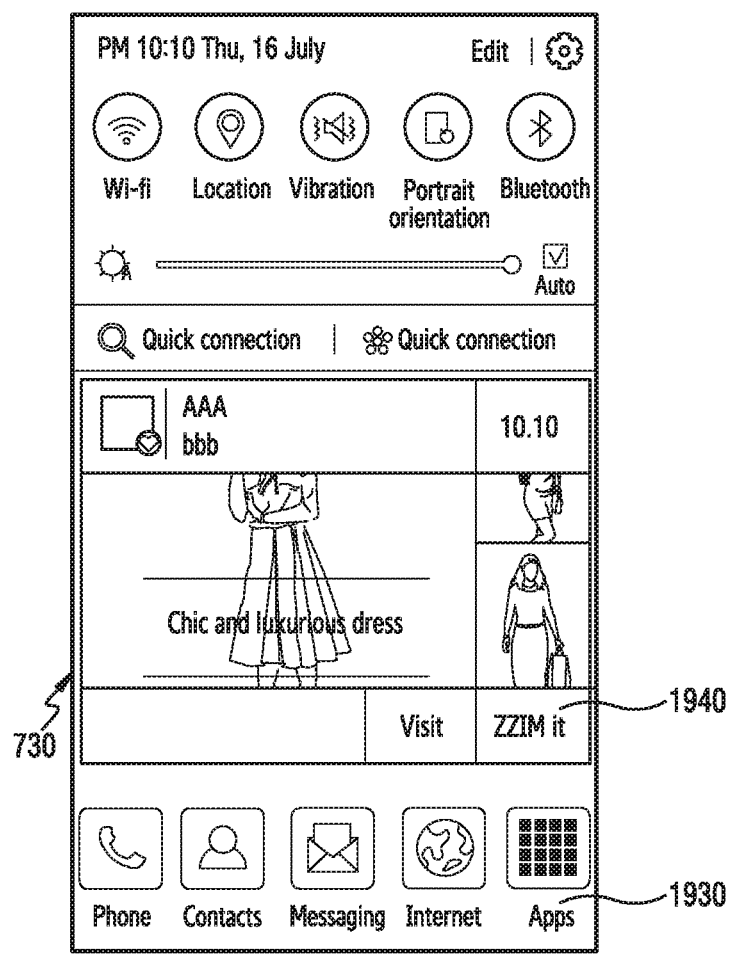
Figure 19D:
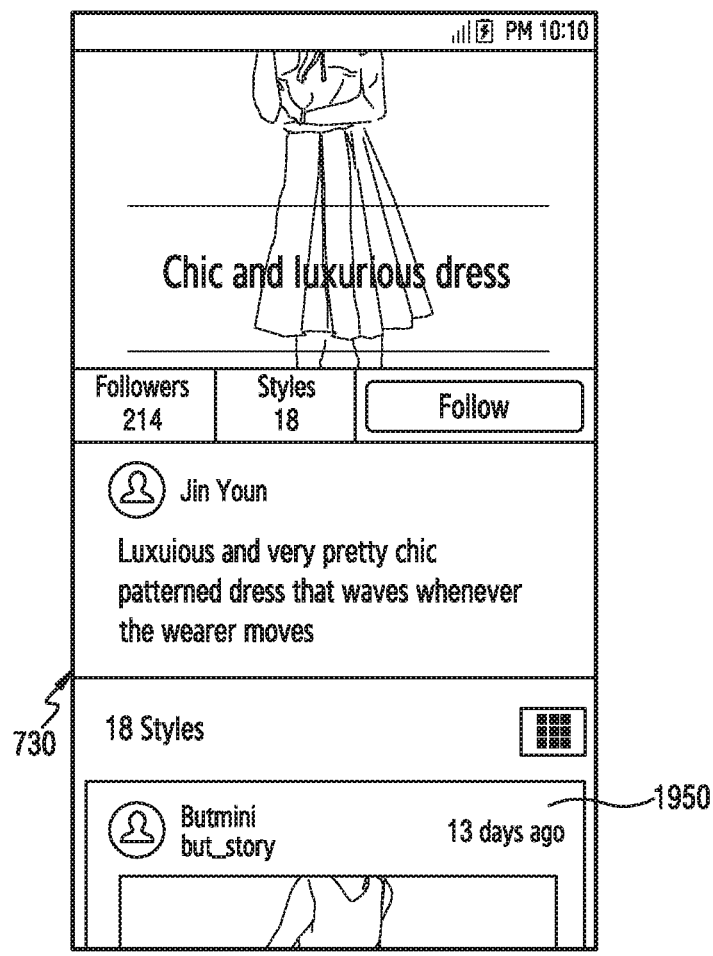

According to another embodiment, the control unit 770 may detect an activation signal in the state where the display unit 730 is in the on-state, as illustrated in FIG. 19A. For example, the control unit 770 may detect an activation signal in the course of displaying a background screen 1910. Through the detection, the control unit 770 may receive a reference signal in response to an activation signal. Then, the control unit 770 may display notification data corresponding to the reference signal, as illustrated in FIG. 19B. For example, the control unit 770 may display a notification window 1920 of the notification data on the background screen 1910. The control unit 770 may display a partial content of the notification data on the notification window 1920. For example, the control unit 770 may display a web page address on the notification window 1920. When a touch gesture for enlarging the notification window 1920 is detected, the control unit 770 may display a notification screen 1930 of the notification data, as illustrated in FIG. 19C. The control unit 770 may display the entire content of the notification data on the notification screen 1930. Also, when a touch gesture for requesting information of interest is sensed through the notification window 1920 or the notification screen 1930, the control unit 770 may display an information screen 1940, as illustrated in FIG. 19D. The control unit 770 may display information of interest on the information screen 1940. For example, the information screen 1940 may be a web page including information of interest.

According to various embodiments, the electronic device 120 does not unconditionally receive a reference signal but receives the reference signal in response to an activation signal. That is, the electronic device 120 can receive a reference signal only as needed. Therefore, the power consumption of the electronic device 120 can be decreased. Further, the electronic device 120 is not required to perform an operation, such as changing a configuration, in order to receive a reference signal. Therefore, the electronic device 120 can easily receive information of interest. Accordingly, the operation efficiency of the electronic device 120 can be improved. In addition, the electronic device 120 can detect an activation signal from a simple operation of a user. Therefore, a user convenience with the electronic device 120 can be improved.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or changed forms derived from the technical idea of the present disclosure fall within the scope of the present disclosure.

The invention claimed is:

1. An operating method of an electronic device, the operating method comprising:
   identifying, by using at least one sensor included in the electronic device, a user input for temporarily activating a predetermined communication function while the predetermined communication function is deactivated and a display of the electronic device is off;
   in response to identifying the user input, activating the predetermined communication function to receive a first signal from a nearby located external device; and
   based on the first signal being obtained from the nearby located external device is obtained:
      obtaining notification data corresponding to the first signal from the external device,
      displaying a notification corresponding to the notification data,
      requesting information of interest to the external device based on the notification data,
      obtaining the information of interest from the external device, and
      deactivating the predetermined communication function without receiving another user input.

2. The operating method of claim 1, wherein the identifying of the user input comprises:
   obtaining at least one signal using the at least one sensor;
   comparing the at least one signal with a predetermined activation condition; and
   based on the comparison, identifying the at least one signal as the user input for temporarily activating the predetermined communication function.

3. The operating method of claim 1,
   wherein the at least one sensor includes a microphone, and
   wherein the identifying of the user input comprises identifying an acoustic signal, received via the microphone, as the user input for temporarily activating the predetermined communication function if the acoustic signal corresponds to a tapping gesture on the display of the electronic device.

4. The operating method of claim 1,
   wherein the at least one sensor includes a motion sensor, and
   wherein the identifying of the user input comprises identifying a motion signal, received via the motion sensor, as the user input for temporarily activating the predetermined communication function if the motion signal corresponds to a predefined movement gesture of the electronic device.

5. The operating method of claim 1, further comprising:
   based on the obtaining of the first signal, performing authentication on a reference signal based on the first signal; and
   receiving information of interest based on a successful authentication.

6. The operating method of claim 1, further comprising:
   based on the obtaining of the first signal, transmitting a second signal to the external device to authenticate the first signal; and
   obtaining the notification data corresponding to the first signal from the external device according to a result of the authentication.

7. An electronic device comprising:
   a display;
   at least one sensor;
   a first wireless communication circuitry for a communication function; and
   at least one processor connected to the display, the at least one sensor, and the first wireless communication circuitry,
   wherein the at least one processor is configured to:
      while the display is off and the communication function is deactivated, identify, by using the at least one sensor, a user input for temporarily activating the communication function,
      in response to identifying the user input, activate the communication function to receive a first signal from a nearby located external device, and
      based on the first signal being obtained from the nearby located external device is:
         obtain notification data corresponding to the first signal from the external device;
         display a notification corresponding to the notification data;
         request information of interest to the external device based on the notification data;
         obtain the information of interest from the external device; and
         deactivate the communication function without receiving another user input.

8. The electronic device of claim 7, wherein the first wireless communication circuitry comprises a near field communication (NFC) module and the first signal comprises a reference signal including information corresponding to the nearby located external device.

9. The electronic device of claim 8, further comprising:
   a second wireless communication circuitry,
   wherein the at least one processor is further configured to:
      based on the information included in the reference signal, control the second wireless communication circuitry to receive commercial information associated with the nearby located external device transmitting the reference signal, and
      display the commercial information via the display.

10. The electronic device of claim 7, wherein the identifying of the user input for temporarily activating the communication function comprises:
    obtaining at least one signal using the at least one sensor,
    comparing the at least one signal with a predetermined activation condition, and
    based on the comparison, identifying the at least one signal as the user input for temporarily activating the communication function.

11. The electronic device of claim 7,
    wherein the at least one sensor includes a microphone, and
    wherein the at least one processor is further configured to identify an acoustic signal, received via the microphone, as the user input for temporarily activating the communication function if the acoustic signal corresponds to a tapping gesture on the display of the electronic device.

12. The electronic device of claim 7,
wherein the at least one sensor includes a motion sensor, and
wherein the at least one processor is further configured to identify a motion signal, received via the motion sensor, as the user input for temporarily activating the communication function if the motion signal corresponds to a predefined movement gesture of the electronic device.

13. The electronic device of claim 7, wherein the at least one processor is further configured to:
based on the obtaining of the first signal, perform authentication on a reference signal based on the first signal, and
receive information of interest based on a successful authentication.

14. The electronic device of claim 7, wherein the processor is further configured to:
based on the obtaining of the first signal, transmit a second signal to the external device to authenticate the first signal, and
obtain the notification data corresponding to the first signal from the external device according to a result of the authentication.

* * * * *